United States Patent
Shveidel et al.

(10) Patent No.: US 11,126,361 B1
(45) Date of Patent: Sep. 21, 2021

(54) MULTI-LEVEL BUCKET AGGREGATION FOR JOURNAL DESTAGING IN A DISTRIBUTED STORAGE SYSTEM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 16/819,447

(22) Filed: Mar. 16, 2020

(51) Int. Cl.
G06F 3/06 (2006.01)

(52) U.S. Cl.
CPC .......... *G06F 3/0644* (2013.01); *G06F 3/0604* (2013.01); *G06F 3/067* (2013.01)

(58) Field of Classification Search
CPC ....... G06F 3/0644; G06F 3/0604; G06F 3/067
See application file for complete search history.

(56) References Cited

U.S. PATENT DOCUMENTS

| | | |
|---|---|---|
| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |

(Continued)

FOREIGN PATENT DOCUMENTS

WO 2016111954 A1 7/2016

OTHER PUBLICATIONS

PCT/US2019/024885, WO, Jan. 7, 2020, International Search Report and Written Opinion.

(Continued)

*Primary Examiner* — Ryan Bertram
(74) *Attorney, Agent, or Firm* — Ryan, Mason & Lewis, LLP

(57) ABSTRACT

An apparatus comprises at least one processing device configured to maintain a metadata update journal for at least a first storage node of a plurality of storage nodes of a distributed storage system, and to destage the metadata update journal of the first storage node to one or more storage devices accessible to the first storage node. The metadata update journal of the first storage node utilizes a multi-level bucket aggregation of metadata updates in which metadata pages each comprising a plurality of address-to-hash mapping pairs are arranged in a plurality of first-level buckets containing respective subsets of the metadata pages for respective different logical storage volumes, and a plurality of second-level buckets are each configured to aggregate multiple metadata pages from different ones of the first-level buckets in order to increase a number of metadata updates in each second-level bucket relative to numbers of metadata updates in its corresponding first-level buckets.

20 Claims, 9 Drawing Sheets

(56) References Cited

U.S. PATENT DOCUMENTS

| | | | |
|---|---|---|---|
| 9,716,754 | B2 | 7/2017 | Swift |
| 9,891,994 | B1 | 2/2018 | Schneider et al. |
| 10,152,381 | B1* | 12/2018 | Shvaiger .............. G06F 3/0661 |
| 10,176,046 | B1 | 1/2019 | Hu et al. |
| 10,254,996 | B1* | 4/2019 | Jain ...................... G06F 3/0647 |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Strange et al. |
| 10,389,704 | B1* | 8/2019 | Gupta ................. H04L 63/0823 |
| 10,394,485 | B1 | 8/2019 | Chen et al. |
| 10,437,501 | B1 | 10/2019 | Kucherov et al. |
| 10,437,855 | B1 | 10/2019 | Strange et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,956,346 | B1* | 3/2021 | Ben-Yehuda ........... G06F 12/10 |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2013/0117286 | A1* | 5/2013 | Gallant ...................... G06F 7/24 707/752 |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185326 | A1* | 6/2017 | Meiri ...................... G06F 3/067 |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2019/0042115 | A1* | 2/2019 | Anderson ........... G06F 12/0842 |
| 2019/0303490 | A1 | 10/2019 | Chen et al. |
| 2019/0392060 | A1 | 12/2019 | Meiri et al. |
| 2020/0026616 | A1 | 1/2020 | Hu et al. |
| 2020/0125684 | A1* | 4/2020 | Gupta ................. G06F 12/0868 |
| 2020/0142627 | A1* | 5/2020 | Kucherov ............. G06F 3/0673 |
| 2020/0293447 | A1* | 9/2020 | Gupta ................. G06F 12/0804 |
| 2021/0133117 | A1* | 5/2021 | Shabi ................... G06F 12/126 |

OTHER PUBLICATIONS

PCT/US2019/024900, WO, Jan. 7, 2020, International Search Report and Written Opinion.

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. on Jul. 28, 2017, and entitled "Token-Based Data Flow Control in a Clustered Storage System."

U.S. Appl. No. 15/793,121 filed in the name of David Meiri et al. on Oct. 25, 2017, and entitled "Opportunistic Compression of Replicated Data in a Content Addressable Storage System."

U.S. Appl. No. 15/824,536 filed in the name of Christopher Sayles et al. on Nov. 28, 2017, and entitled "Storage System with Asynchronous Messaging between Processing Modules for Data Replication."

U.S. Appl. No. 16/253,793 filed in the name of Yuval Harduf et al. on Jan. 22, 2019, and entitled "Storage System with Data Consistency Checking in Synchronous Replication Using Active Snapshot Set."

U.S. Appl. No. 16/265,131 filed in the name of Lior Kamran et al. on Feb. 1, 2019, and entitled "Storage System with Write Cache Release Protection."

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. on Apr. 29, 2019, and entitled "Storage System with Deduplication-Aware Replication Implemented Using a Standard Storage Command Protocol."

U.S. Appl. No. 16/413,050 filed in the name of Xiangping Chen et al. on May 15, 2019, and entitled "Storage System with Coordinated Recovery across Multiple Input-Output Journals of Different Types."

U.S. Appl. No. 16/663,524 filed in the name of Xiangping Chen et al. on Oct. 25, 2019, and entitled "Storage System with Throughput-Based Timing of Synchronous Replication Recovery."

U.S. Appl. No. 16/665,651 filed in the name of Lior Kamran et al. on Oct. 28, 2019, and entitled "Recovery Flow with Reduced Address Lock Contention in a Content Addressable Storage System."

U.S. Appl. No. 16/166,397 filed in the name of Nimrod Shani et al. on Oct. 22, 2018, and entitled "Storage System with Data Integrity Verification Performed in Conjunction with Internal Data Movement."

U.S. Appl. No. 16/446,138 filed in the name of William F. Moore et al. on Jun. 19, 2019, and entitled "Prefill of Raid Stripes in a Storage System by Reading of Existing Data."

U.S. Appl. No. 16/446,161 filed in the name of William F. Moore et al. on Jun. 19, 2019, and entitled "Automatic Prefill of a Storage System with Conditioning of Raid Stripes."

U.S. Appl. No. 16/446,183 filed in the name of William F. Moore et al. on Jun. 19, 2019, and entitled "Distributed Generation of Random Data in a Storage System."

(56) References Cited

OTHER PUBLICATIONS

U.S. Appl. No. 16/530,121 filed in the name of Anton Kucherov et al. on Aug. 2, 2019, and entitled "Memory-Efficient Processing of Raid Metadata Bitmaps."
U.S. Appl. No. 16/671,824 filed in the name of Lior Kamran et al. on Nov. 1, 2019, and entitled "Storage System Capacity Expansion Using Mixed-Capacity Storage Devices."
U.S. Appl. No. 16/693,858 filed in the name of Doron Tal on Nov. 25, 2019, and entitled "Storage System with Prioritized RAID Rebuild."
U.S. Appl. No. 16/526,641 filed in the name of Vladimir Shveidel et al. on Jul. 30, 2019, and entitled "Hash-Based One-Level Mapping for Storage Clusters."

* cited by examiner

MULTI-LEVEL BUCKET AGGREGATION FOR JOURNAL DESTAGING IN A DISTRIBUTED STORAGE SYSTEM

FIELD

The field relates generally to information processing systems, and more particularly to storage in information processing systems.

BACKGROUND

A wide variety of different types of distributed storage systems are known. Such storage systems include clustered storage systems as well as other types of storage systems that are distributed across multiple storage nodes. Distributed storage systems can include a potentially large number of distributed storage nodes that are interconnected by a mesh network or other type of communication network. Each such storage node of a distributed storage system typically processes input-output (TO) operations from one or more host devices and in processing those IO operations runs various storage application processes that generally involve interaction of that storage node with one or more other ones of the storage nodes. In these and other conventional arrangements, journal destaging performed by the storage nodes can adversely impact the processing of IO operations received from the host devices.

SUMMARY

Illustrative embodiments provide techniques for journal destaging that overcome drawbacks of conventional arrangements. For example, some embodiments provide metadata update journal destaging using multi-level bucket aggregation for improved amortization and reduced bandwidth utilization in a distributed storage system.

As disclosed herein, conventional journal destaging arrangements based on batch aggregation can be highly inefficient in the presence of certain types of write operations, such as, for example, random writes, writes to a large number of relatively small logical storage volumes, and writes involving many short-lived snapshots with a relatively small number of overwrites. These types of write operations generally involve only relatively small numbers of metadata updates, but as such metadata updates are destaged to persistent storage using fixed-size pages, amortization efficiency is low and excessive amounts of bandwidth are consumed by the relatively small numbers of updates, thereby degrading the overall IO processing performance of the distributed storage system.

The multi-level bucket aggregation provided in illustrative embodiments disclosed herein can dramatically improve metadata update journal amortization, thereby reducing bandwidth utilization and improving overall system performance.

For example, the multi-level bucket aggregation in some embodiments is configured to assign storage volumes to respective first-level buckets in a manner that improves the amortization of metadata updates for at least a subset of the second-level buckets. A first-level bucket is illustratively associated with a portion of a specific volume, and therefore includes entries for only that one specific volume, while each of one or more second-level buckets aggregates metadata pages from multiple distinct first-level buckets.

Accordingly, in some embodiments, multiple relatively small logical storage volumes each with relatively few metadata updates may be assigned to first-level buckets that will be aggregated into a single second-level bucket, thereby improving the amortization for the single second-level bucket relative to its corresponding individual first-level buckets. A relatively large logical storage volume that has a relatively large number of metadata updates may be assigned to one or more first-level buckets for which metadata pages will not be combined with metadata pages from first-level buckets of other logical storage volumes, thereby maintaining an already high amortization in such situations.

In one embodiment, an apparatus comprises at least one processing device comprising a processor coupled to a memory. The at least one processing device is configured to maintain a metadata update journal for at least a first storage node of a plurality of storage nodes of a distributed storage system, and to destage the metadata update journal of the first storage node to one or more storage devices accessible to the first storage node. The metadata update journal of the first storage node utilizes a multi-level bucket aggregation of metadata updates in which metadata pages each comprising a plurality of address-to-hash mapping pairs are arranged in a plurality of first-level buckets containing respective subsets of the metadata pages for respective different logical storage volumes, and a plurality of second-level buckets are each configured to aggregate multiple metadata pages from different ones of the first-level buckets in order to increase a number of metadata updates in each second-level bucket relative to numbers of metadata updates in its corresponding first-level buckets.

The storage nodes of the distributed storage system are illustratively interconnected in a mesh network, although other interconnection arrangements may be used. The one or more storage devices illustratively comprises a first plurality of storage devices associated with the first storage node and one or more additional pluralities of storage devices associated with respective additional ones of the storage nodes. The storage devices associated with a given one of the storage nodes are illustratively implemented in a disk array enclosure or other type of storage array enclosure of the given storage node.

Each of at least a subset of the storage nodes of the distributed storage system in some embodiments illustratively comprises a set of processing modules configured to communicate with corresponding sets of processing modules on other ones of the storage nodes, with a given such set of processing modules comprising, for example, at least a routing module, a control module and a data module. The sets of processing modules of the respective storage nodes of the distributed storage system collectively comprise at least a portion of a distributed storage controller of the distributed storage system.

The second-level buckets in some embodiments are arranged in pages, and multiple metadata pages aggregated from different ones of the first-level buckets into a particular one of the pages of a given one of the second-level buckets have a same page index within their respective first-level buckets, although it is to be appreciated that other aggregation arrangements can be used in other embodiments.

A given one of the second-level buckets illustratively comprises a plurality of entries from respective different ones of the first-level buckets with each such entry comprising at least one of the metadata pages and a corresponding first-level bucket identifier for that metadata page.

Additionally or alternatively, a given one of the second-level buckets illustratively comprises a plurality of entries from respective different ones of the first-level buckets with the plurality of entries being arranged within a plurality of dynamic partitions associated with the respective different ones of the first-level buckets.

In some embodiments, the maintaining and destaging of the metadata update journal are performed utilizing second-level bucket pages of one or more of the second-level buckets.

For example, each of a plurality of metadata pages of a given one of the second-level bucket pages illustratively has the same page index within its corresponding one of the first-level buckets.

Additionally or alternatively, existence bitmaps are maintained for respective ones of the second-level bucket pages with each such existence bitmap indicating which of the metadata pages are present in the corresponding second-level bucket page.

The multi-level bucket aggregation in some embodiments is configured to assign metadata pages for multiple relatively small logical storage volumes with respective relatively small numbers of metadata updates to first-level buckets for which the metadata pages are aggregated into a single second-level bucket, and to assign metadata pages for a relatively large logical storage volume that has a relatively large number of metadata updates to one or more first-level buckets for which the metadata pages are not combined with metadata pages of other first-level buckets of other logical storage volumes in aggregating metadata pages of those one or more first-level buckets into one or more second-level buckets.

The metadata update journal in some embodiments tracks updates to an address-to-hash metadata structure of the distributed storage system. Other types of metadata structures can additionally or alternatively be tracked in other embodiments.

In some embodiments, obsoleted bitmaps are maintained for respective ones of the second-level bucket pages with each such obsoleted bitmap indicating entries of the corresponding second-level bucket page for which one or more associated first-level buckets are obsolete due to deletion of its corresponding logical storage volume. Entries of a given one of the obsoleted bitmaps for one or more of the first-level buckets are illustratively set, for example, to a logic "1" value, in conjunction with the deletion of the corresponding logical storage volume and are subsequently cleared in conjunction with metadata updates to the one or more first-level buckets subsequent to creation of a new logical storage volume having a same volume identifier as the deleted logical storage volume.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
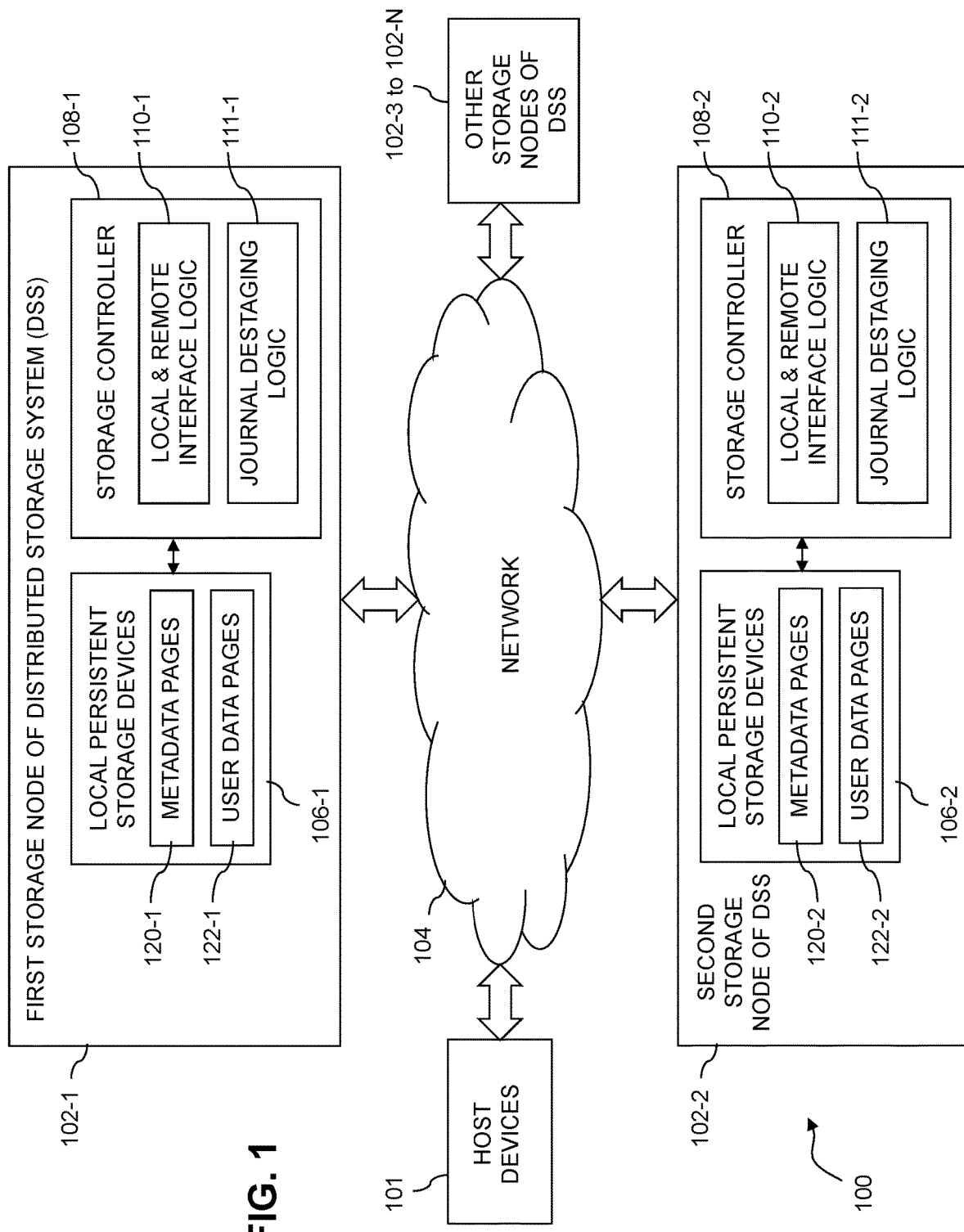
FIG. 1 is a block diagram of an information processing system comprising a distributed storage system incorporating functionality for multi-level bucket aggregation for journal destaging in an illustrative embodiment.

FIG. 1 shows an information processing system 100 configured in accordance with an illustrative embodiment. The information processing system 100 comprises a plurality of host devices 101, a first storage node 102-1, a second storage node 102-2, and a plurality of additional storage nodes 102-3 through 102-N, all of which are configured to communicate with one another over a network 104. The first and second storage nodes 102 with the additional storage nodes 102-3 through 102-N collectively form an example of what is more generally referred to herein as a "distributed storage system" or DSS. Other distributed storage systems can include different numbers and arrangements of storage nodes. For example, a distributed storage system in some embodiments may include only the first and second storage nodes 102.

Each of the storage nodes 102 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 102. The term "input-output" as used herein refers to at least one of input and output. For example, IO operations may comprise write requests and/or read requests directed to logical addresses of a particular logical storage volume of a given one of the storage nodes 102. These and other types of IO operations are also generally referred to herein as IO requests.

The storage nodes 102 illustratively comprise respective processing devices of one or more processing platforms. For example, the storage nodes 102 can each comprise one or more processing devices each having a processor and a memory, possibly implementing virtual machines and/or containers, although numerous other configurations are possible.

The storage nodes 102 can additionally or alternatively be part of cloud infrastructure such as an Amazon Web Services (AWS) system. Other examples of cloud-based systems that can be used to provide at least portions of the storage nodes 102 include Google Cloud Platform (GCP) and Microsoft Azure.

The storage nodes 102 may be implemented on a common processing platform, or on separate processing platforms.

The host devices 101 are illustratively configured to write data to and read data from the distributed storage system comprising storage nodes 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage node 102-1 comprises a plurality of storage devices 106-1 and an associated storage controller 108-1. The storage devices 106-1 store metadata pages 120-1 and user data pages 122-1 associated with one or more storage volumes of the distributed storage system. The storage volumes illustratively comprise respective logical units (LUNs) or other types of logical storage volumes. The storage devices 106-1 more particularly comprise local persistent storage devices of the first storage node 102-1. Such persistent storage devices are local to the first storage node 102-1, but remote from the second storage node 102-2 and the other storage nodes 102.

Similarly, the second storage node 102-2 comprises a plurality of storage devices 106-2 and an associated storage controller 108-2. The storage devices 106-2 store metadata pages 120-2 and user data pages 122-2 associated with one or more storage volumes of the distributed storage system, such as the above-noted LUNs. The storage devices 106-2 more particularly comprise local persistent storage devices of the second storage node 102-2. Such persistent storage devices are local to the second storage node 102-2, but remote from the first storage node 102-1 and the other storage nodes 102.

The storage controller 108-1 of first storage node 102-1 in the FIG. 1 embodiment includes local and remote interface logic 110-1 and journal destaging logic 111-1. It can also include additional elements, such as a signature generator for generating content-based signatures of respective data pages.

Similarly, the storage controller 108-2 of second storage node 102-2 includes local and remote interface logic 110-2 and journal destaging logic 111-2. The storage controller 108-2, like the storage controller 108-1, can also include additional elements, such as a signature generator for generating content-based signatures of respective data pages.

The instances of local and remote interface logic 110-1 and 110-2 are collectively referred to herein as local and remote interface logic 110. Such local and remote interface logic instances are also referred to herein as individually or collectively comprising distributed logic instances of the system 100.

The local and remote interface logic 110 of the storage nodes 102 controls interaction of the storage nodes 102 with local and remote storage devices 106 of the distributed storage system. The local persistent storage of a given one of the storage nodes 102 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 102 via remote interfaces. The local and remote interface logic 110 illustratively controls the manner in which the local and remote interfaces are used to access persistent storage of the given node, as will be described in more detail elsewhere herein.

For example, it is assumed in some embodiments each of the storage devices 106 on a given one of the storage nodes 102 can be accessed by the given storage node via its local interface, or by any of the other storage nodes via a remote direct memory access (RDMA) interface. A given storage application executing on the storage nodes 102 illustratively requires that all of the storage nodes 102 be able to access all of the storage devices 106. Such access to local persistent storage of each node from the other storage nodes can be performed, for example, using the RDMA interfaces with the other storage nodes, although other arrangements are possible.

The instances of journal destaging logic 111-1 and 111-2 are collectively referred to herein as journal destaging logic 111. Such journal destaging logic instances are illustratively configured to control performance of at least portions of processes described herein for metadata update journal destaging. For example, the journal destaging logic 111 illustratively implements an algorithm within the storage nodes 102 that includes processes such as that to be described below in conjunction with FIG. 5.

Each of the other storage nodes 102 of the distributed storage system of FIG. 1 is assumed to be configured in a manner similar to that described above for the first storage node 102-1 and the second storage node 102-2.

The storage controllers 108 of the storage nodes 102 may include additional modules and other components typically found in conventional implementations of storage controllers and storage systems, although such additional modules and other components are omitted from the figure for clarity and simplicity of illustration.

For example, the storage controllers 108 can comprise or be otherwise associated with a write cache and a write cache journal, both also illustratively distributed across the storage nodes 102 of the distributed storage system. It is further assumed in illustrative embodiments that one or more additional journals are provided, including at least a metadata update journal. Illustrative embodiments disclosed herein provide efficient techniques for maintaining and destaging of a metadata update journal using multi-level bucket aggregation functionality implemented in the storage nodes 102.

The storage devices 106 of the storage nodes 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 102 of the distributed storage system of FIG. 1.

In some embodiments, the storage nodes 102 of the distributed storage system collectively provide a scale-out all-flash content addressable storage array such as an XtremIO™ storage array from Dell EMC of Hopkinton, Mass. The storage nodes 102 can be used to implement other types of storage systems in other embodiments. One or more such storage nodes can be associated with at least one storage array, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The distributed storage system of FIG. 1 implements functionality for multi-level bucket aggregation for metadata update journal destaging, utilizing instances of local and remote interface logic 110 and journal destaging logic 111 of the storage controllers 108 of respective ones of the storage nodes 102, as will now be described in more detail.

As indicated previously, the storage nodes 102 of the distributed storage system of FIG. 1 process IO operations from one or more host devices 101 and in processing those IO operations run various storage application processes that generally involve interaction of that storage node with one or more other ones of the storage nodes. In conventional implementations, journal destaging performed by storage nodes can adversely impact the processing of IO operations received from host devices. For example, conventional journal destaging arrangements based on batch aggregation can be highly inefficient in the presence of certain types of write operations, such as, for example, random writes, writes to a large number of relatively small logical storage volumes, and writes involving many short-lived snapshots with a relatively small number of overwrites. These types of write operations generally involve only relatively small numbers of metadata updates, but as such metadata updates are destaged to persistent storage using fixed-size pages, amortization efficiency is low and excessive amounts of bandwidth are consumed by the relatively small numbers of updates, thereby degrading the overall IO processing performance of the distributed storage system.

The distributed storage system of FIG. 1 and other illustrative embodiments herein advantageously overcome these and other drawbacks of conventional practice by providing improved journal maintenance and destaging arrangements. For example, the distributed storage system of FIG. 1 is illustratively configured to provide multi-level bucket aggregation functionality for metadata update journal maintenance and destaging. In some embodiments, this is achieved by configuring each of at least a subset of the storage nodes 102 of the distributed storage system to implement such functionality, in a manner that substantially enhances amortization and reduces bandwidth consumption in the journal destaging process.

In some embodiments, the multi-level bucket aggregation is configured to assign storage volumes to respective first-level buckets in a manner that improves the amortization of metadata updates for at least a subset of the second-level buckets. A first-level bucket is illustratively associated with a portion of a specific volume, and therefore includes entries for only that one specific volume, while each of one or more second-level buckets aggregates metadata pages from multiple distinct first-level buckets.

Accordingly, in some embodiments, multiple relatively small logical storage volumes each with relatively few metadata updates may be assigned to first-level buckets that will be aggregated into a single second-level bucket, thereby improving the amortization for the single second-level bucket relative to its corresponding individual first-level buckets. A relatively large logical storage volume that has a relatively large number of metadata updates may be assigned to one or more first-level buckets for which metadata pages will not be combined with metadata pages from first-level buckets of other logical storage volumes, thereby maintaining an already high amortization in such situations.

Such arrangements as disclosed herein advantageously avoid the above-noted interference with efficient processing of host device IO operations, and significantly improve the overall IO processing performance of the distributed storage system.

It is assumed in some embodiments that each of the storage nodes 102 incorporates substantially the same functionality for multi-level bucket aggregation for metadata update journal destaging.

The metadata update journal destaging in the present embodiment will be illustrated in conjunction with operations performed by the first storage node 102-1.

Each of the storage nodes 102 illustratively stores a metadata update journal in low-latency electronic memory of that storage node. The metadata update journal in some embodiments is also stored in persistent storage, for example, on designated persistent storage devices of the respective storage nodes 102 in a one-to-one manner, using one designated persistent storage device per storage node, with the journal contents also being duplicated across two other persistent storage devices of the corresponding storage node. The metadata update journal is therefore distributed across the storage nodes 102. Other types and arrangements of metadata update journals can be used in other embodiments.

In some embodiments, storage controller 108-1 of first storage node 102-1 is configured to maintain a metadata update journal, and to destage the metadata update journal of the first storage node 102-1 to one or more storage devices 106 accessible to the first storage node 102-1. The metadata update journal of the first storage node 102-1 utilizes a multi-level bucket aggregation of metadata updates in which metadata pages each comprising a plurality of address-to-hash mapping pairs are arranged in a plurality of first-level buckets containing respective subsets of the metadata pages for respective different logical storage volumes, and a plurality of second-level buckets are each configured to aggregate multiple metadata pages from different ones of the first-level buckets in order to increase a number of metadata updates in each second-level bucket relative to numbers of metadata updates in its corresponding first-level buckets. Additionally or alternatively, other components of the first storage node 102-1, possibly in cooperation with storage controllers 108 or other components of one or more other ones of the storage nodes 102, can perform or otherwise participate in at least one of maintenance and destaging of a metadata update journal using multi-level bucket aggregation as disclosed herein.

It is to be appreciated that, although references are made herein to embodiments that utilize first-level and second-level buckets, other types of multi-level bucket aggregation arrangements, possibly involving more than two distinct levels of buckets, can be used in other embodiments. For example, three-level bucket aggregation arrangements may be used, in which metadata pages of second-level buckets are further aggregated into one or more third-level buckets. Also, the term "bucket" as used herein is intended to be broadly construed, so as to encompass a wide variety of different data structures or other arrangements for indicating membership of particular metadata pages or associated metadata updates in certain groupings.

In some embodiments, the second-level buckets are arranged in pages and multiple metadata pages aggregated from different ones of the first-level buckets into a particular one of the pages of a given one of the second-level buckets have a same page index within their respective first-level buckets. Other types of aggregation arrangements not requiring this same page index arrangement can also be used.

In a first example of a second-level bucket layout option, a given one of the second-level buckets illustratively comprises a plurality of entries from respective different ones of the first-level buckets with each such entry comprising at least one of the metadata pages and a corresponding first-level bucket identifier for that metadata page. For example, in some arrangements of this type, each second-level bucket includes mixed entries of the different first-level buckets, with each entry illustratively comprising additional bits to identify its corresponding first-level bucket.

Another example of a second-level bucket layout option involves the use of dynamic partitions for respective ones of the first-level buckets. In some embodiments of this type, a given one of the second-level buckets comprises a plurality of entries from respective different ones of the first-level buckets with the plurality of entries being arranged within a plurality of dynamic partitions associated with the respective different ones of the first-level buckets. For example, each partition of the given second-level bucket contains entries for only a corresponding one of the first-level buckets. The sizes of the respective partitions are dynamic and can change over time based on variation in numbers and types of metadata updates.

Other examples of metadata pages, first-level buckets and second-level buckets are shown in respective FIGS. 4A, 4B and 4C, to be described in more detail below. These and other examples herein should not be construed as limiting in any way.

The maintaining and destaging of the metadata update journal are illustratively performed by the storage controller 108-1 of the first storage node 102-1 utilizing second-level bucket pages of one or more of the second-level buckets.

For example, each of a plurality of metadata pages of a given one of the second-level bucket pages illustratively has the same page index within its corresponding one of the first-level buckets.

Additionally or alternatively, existence bitmaps are maintained for respective ones of the second-level bucket pages with each such existence bitmap indicating which of the metadata pages are present in the corresponding second-level bucket page.

The multi-level bucket aggregation in some embodiments is configured to assign metadata pages for multiple relatively small logical storage volumes with respective relatively small numbers of metadata updates to first-level buckets for which the metadata pages are aggregated into a single second-level bucket, and to assign metadata pages for a relatively large logical storage volume that has a relatively large number of metadata updates to one or more first-level buckets for which the metadata pages are not combined with metadata pages of other first-level buckets of other logical storage volumes in aggregating metadata pages of those one or more first-level buckets into one or more second-level buckets.

The metadata update journal in some embodiments tracks updates to an address-to-hash ("A2H") table of the type described elsewhere herein, or other type of address-to-hash metadata structure of the distributed storage system. Additional or alternative types of metadata structures can be tracked by a metadata update journal in other embodiments. The term "metadata update journal" as used herein is therefore intended to be broadly construed, and should not be viewed as being limited to use with updates to an A2H table or other specific type or types of metadata structures.

In some embodiments, the storage controller 108-1 of the first storage node 102-1 maintains what are referred to herein as "obsoleted" bitmaps for respective ones of the second-level bucket pages, with each such obsoleted bitmap indicating entries of the corresponding second-level bucket page for which one or more associated first-level buckets are obsolete due to deletion of its corresponding logical storage volume.

Entries of a given one of the obsoleted bitmaps for one or more of the first-level buckets are illustratively set, for example, to a logic "1" value, in conjunction with the deletion of the corresponding logical storage volume and are subsequently cleared, for example, back to a logic "0" value, in conjunction with metadata updates to the one or more first-level buckets subsequent to creation of a new logical storage volume having a same volume identifier as the deleted logical storage volume.

The storage controller 108-1 performs destaging of the metadata update journal of the first storage node 102-1, illustratively utilizing its local and remote interface logic 110-1 and its journal destaging logic 111-1.

The destaging of the metadata update journal of the first storage node 102-1 illustratively includes operations such as loading pages into memory, updating pages in memory, and writing updated pages to persistent storage. For example, for each of a plurality of pages required for the destaging of the metadata update journal, one or more address locks are obtained for the page, and the page is loaded into a memory of the first storage node from persistent storage accessible to the first storage node. The pages illustratively comprise respective ones of the metadata pages 120 stored by the storage nodes 102. It is to be appreciated that the term "address lock" as used herein is intended to be broadly construed, and to encompass various arrangements for providing a storage node with temporary exclusive access to a given one of the metadata pages 120 or other type of page. Metadata updates are performed in the first storage node 102-1 using the loaded pages, corresponding updated pages are written to the persistent storage, and the address locks are released. In some embodiments, at least a subset of the pages may be preloaded in a separate preload phase, performed prior to an update and write phase, in order to minimize the amount of time for which address locks are held for those pages, and thereby further reduce interference with processing of IO operations.

The persistent storage illustratively comprises sets of persistent storage devices 106 associated with respective ones of the storage nodes 102. Some of the storage devices 106 are in the set of local persistent storage devices 106-1 associated with the first storage node 102-1, while others are in one or more other sets of local persistent storage devices 106 associated with respective other ones of the storage nodes 102.

A given set of local persistent storage devices 106 on a given one of the storage nodes 102 is illustratively implemented in a disk array enclosure (DAE) or other type of storage array enclosure of that storage node.

In some embodiments, the distributed storage system metadata for which updates are controlled using the metadata update journal is more particularly organized into metadata pages 120 comprising respective fixed-size pages, with the pages being arranged into page groups, also referred to herein as "superpages." For example, each superpage may comprise a particular designated number of pages, such as 64 pages, with each page being of a particular page size, such as a 4 KB page size, although as indicated elsewhere herein, other page sizes, such as 8 KB or 16 KB, can be used. In order to read from or write to a given one of the metadata pages, that page is locked and its corresponding superpage is also locked. In other words, two different locks are placed, one for the page, and one for the superpage.

Accordingly, for a given one of the pages required for destaging of the metadata update journal, obtaining one or more address locks for the given data page illustratively comprises obtaining an address lock for the given data page and an address lock for its corresponding page group. In some embodiments, the updated pages are written to the persistent storage in batches with each such batch comprising all of the updated pages of one or more of the page groups, although numerous other arrangements can be used.

Additional examples of processes providing multi-bucket aggregation for metadata update journal destaging and suitable for implementation in the distributed storage system of FIG. 1 will now be described.

It is assumed for these additional examples that the metadata update journal is configured to track changes to an A2H table that provides mapping between logical block addresses (LBAs) and hashes of respective user data pages, as described elsewhere herein. The A2H table is illustratively backed up in persistent storage as a set of hash-based backup (HBBKUP) pages, each 16 KB in size, although other page types and page sizes can be used in other embodiments. A given HBBKUP page contains a plurality of LBA-hash pairs, each such pair providing a mapping between a particular LBA and a hash of the corresponding data page. The HBBKUP pages are examples of what are more generally referred to herein as "metadata pages." The HBBKUP pages are illustratively organized in multiple first-level buckets, where each such bucket contains a plurality of HBBKUP pages. A given HBBKUP page can therefore be uniquely identified by a pair comprising a bucket identifier (ID) and a page index of that HBBKUP page within the bucket having the bucket ID.

In some embodiments, the LBA-hash pairs are arranged into first-level buckets using an arithmetic function or other type of function based at least in part on the LBA. For example, techniques such as those disclosed in U.S. patent application Ser. No. 16/526,641, filed Jul. 30, 2019 and entitled "Hash-Based One-Level Mapping for Storage Clusters," which is incorporated by reference herein in its entirety, can be used in illustrative embodiments to assign LBA-hash pairs to first-level buckets. Other assignment techniques can be used in other embodiments disclosed herein.

Each write operation executed in the distributed storage system results in an update to a corresponding entry of the A2H table. For certain types of writes, such as random writes, writes to relatively small storage volumes, and others as previously described, most of the HBBKUP pages will contain only a relatively small number of entries (e.g., 1-2 entries) for metadata updates, leading to amortization inefficiencies and corresponding negative performance impacts as mentioned above.

The multi-level bucket aggregation in the present examples dramatically improves metadata update journal amortization and the overall system performance as a result. More particularly, these examples utilize a SuperBucketDataPage object that will aggregate multiple HBBKUP pages from different first-level buckets but which have the same page index within their respective first-level buckets. Other aggregation arrangements using first-level buckets and second-level buckets can be used in other embodiments.

The SuperBucketDataPage is a particular page of what is more generally referred to herein as a second-level bucket or "superbucket." For example, if SuperBucketDataPage Sk includes 8 first-level buckets A, B, C, D, E, F, G, H, then SuperBucketDataPage Sk[0] will contain logical pages A0, B0, C0, D0, E0, F0, G0 & H0, SuperBucketDataPage Sk[1] will contain logical pages A1, B1, C1, D1, E1, F1, G1 & H1, . . . and SuperBucketDataPage Sk[7] will contain logical pages A7, B7, C7, D7, E7, F7, G7 & H7.

In such an embodiment, journal maintenance is performed using the SuperBucketDataPage, so for example instead of journaling to Bucket A Page Index 7, journaling is done to the corresponding SuperBucketDataPage Sk[7]. Therefore, journal amortization grows linearly as a function of the number of buckets in a superbucket.

Destaging in such an embodiment illustratively involves writing the journaled HBBKUP pages to persistent storage. When destaging SuperBucketDataPage Sk[i], a corresponding HBBKUP page is constructed for destaging, from the entries related to bucket pages Ai, Bi, Ci, Di, Ei, Fi, Gi & Hi. The resulting HBBKUP page is also considered a type of second-level bucket page as that term is broadly used herein.

The SuperBucketDataPage layout options illustratively include at least the following possible arrangements:

1. Mix the page entries within a given SuperBucketDataPage of the second-level bucket, with the addition of sufficient bits for each entry in order to identify the corresponding first-level bucket.

2. Define a partition for each bucket inside the SuperBucketDataPage. This is illustratively implemented using a dynamic approach, in which bucket partition sizes can dynamically vary based on the actual numbers of entries. Such an embodiment is more storage efficient in some embodiments.

When the entries do not fit within a single page, the SuperBucketDataPage can be split by, for example, splitting each of a plurality of first-level bucket partitions within the SuperBucketDataPage. It is possible and acceptable that one or more of the buckets may have no entries in a specific SuperBucketDataPage or in the corresponding second-level bucket in its entirety.

In the above-described embodiment, it is not necessary to maintain an existence bitmap for each first-level bucket. Instead, it is sufficient to maintain an existence bitmap per SuperBucketDataPage. Such an existence bitmap may be maintained, for example, in a SuperBucketMDPage, where MD denotes metadata. Other existence bitmap arrangements can be used in other embodiments.

When a logical storage volume is deleted, its associated first-level bucket should also be deleted. This is illustratively done by marking the first-level bucket as "empty" inside the SuperBucketMDPage. After such marking, all entries and partitions related to the first-level bucket in all SuperBucketDataPages are considered free space and will be removed in the next page destage operation.

However, if the same storage volume ID is reused, its first-level bucket becomes valid again, and all obsoleted entries that were not yet removed during destage become valid again. To address this storage volume ID reuse issue, an obsoleted bitmap is utilized as follows. For each bucket, an obsoleted bitmap that is stored in the SuperBucketMDPage. The obsoleted bitmap has the same size and configuration as the existence bitmap. Normally, all bits of the obsoleted bitmap are cleared to a logic "0" value. In conjunction with deletion of a storage volume and its corresponding first-level bucket, all the bits of the obsoleted bitmap for the deleted first-level bucket are set to "1" to indicate that entries related to this first-level bucket in all pages are obsoleted. Thereafter, each time a SuperBucketDataPage is destaged, the entries and associated partitions related to the deleted first-level bucket are filtered out, and the corresponding obsoleted bitmap bits previously set to "1" are reset to "0" in conjunction with writing of the updated SuperBucketMDPage to persistent storage.

The resetting of the obsoleted bitmap bits in conjunction with writing of the updated SuperBucketMDPage to persistent storage is not required for correctness, and in some situations the corresponding bits can remain at their respective "1" values. However, the resetting of the obsoleted bitmap bits generally should be done if the destage operation is processing new entries related to an obsoleted and reused first-level bucket.

In both lazy load and load-on-demand processes, when loading from persistent storage into memory of a storage node, entries relating to a given bucket are ignored if the corresponding entries in the obsoleted bitmap are set to "1" values.

The obsoleted bitmap as described above is therefore used to handle problems that might otherwise arise when a storage volume is deleted, such that all of its associated first-level buckets are deleted, and a new storage volume is created with the same volume ID such that the deleted buckets are now related to the new storage volume. A "set" bit in the obsoleted bitmap indicates that the entries in this bucket are related to a deleted volume. When the new volume has updates in these buckets, the buckets are updated and the corresponding obsoleted bitmap bits are cleared.

Illustrative embodiments improve metadata update journal destaging amortization in various problematic write scenarios, reduce the bandwidth utilization and as a result improve the overall system performance. For example, the second-level bucket aggregation allows the distributed storage system to assign volumes to first-level buckets so that the corresponding second-level bucket will have better amortization.

In a case in which the bucket depth of a given first-level bucket is zero, such that there is only one page in the first-level bucket, the unused space of the corresponding bitmap partition of the second-level bucket can be used for storing hashes. For example, approximately the first 100 hashes can be stored in the SuperBucketMDPage, without writing a second-level bucket page to persistent storage.

Such an arrangement can save one or more initial destage operations for a given second-level bucket, and is particularly useful for arrangements involving small or frequent snapshots.

It should be noted that the address-to-hash mappings inside a physical page of the distributed storage system in some embodiments need not be indexed in any way, since it is typically not necessary to locate a specific entry. These pages are illustratively used as backup, and possibly only during a loading phase, such as when the system is initialized or recovering from failure events, and not during normal operation. When these pages are loaded, all mappings are typically processed in order to update them into memory, and as a result there may be no need to locate a specific entry.

Each of the other storage nodes 102 of the distributed storage system of FIG. 1 is assumed to operate in a manner similar to that described above for the first storage node 102-1. For example, the above-described operations associated with metadata update journal maintenance and destaging are illustratively performed at least in part by or under the control of the instances of local and remote interface logic 110 operating in cooperation with the instances of journal destaging logic 111 in the storage controllers 108 of the respective ones of the different storage nodes 102.

Such operations provide illustrative examples of processes implementing multi-level bucket aggregation for metadata update journal destaging in a distributed storage system comprising at least first and second storage nodes 102.

Additional or alternative steps may be used in such a process in other embodiments. Also, the ordering of the steps can be varied, and different portions of the process can be performed at least in part in parallel with one another.

An additional illustration of an example process for metadata update journal destaging implementing at least some of the above-described operations will be provided below in conjunction with the flow diagram of FIG. 5.

As indicated above, the storage nodes 102 in some embodiments each implement substantially the same multi-level bucket aggregation functionality for metadata update journal maintenance and destaging via their respective instances of local and remote interface logic 110 and journal destaging logic 111.

The storage nodes 102 collectively comprise an example of a distributed storage system. The term "distributed storage system" as used herein is intended to be broadly construed, so as to encompass, for example, clustered storage systems or other types of storage systems distributed over multiple storage nodes. A given such storage node can comprise a set of processing modules configured to communicate with corresponding sets of processing modules on other ones of the storage nodes. The sets of processing modules of the storage nodes collectively comprise a distributed storage controller of the distributed storage system.

The storage nodes 102 in some embodiments are part of a distributed content addressable storage system in which logical addresses of data pages are mapped to physical addresses of the data pages in the storage devices 106 using respective content-based signatures that are generated from those data pages, as will now be described in more detail with reference to the illustrative embodiments of FIGS. 2 and 3.

Figure 2:
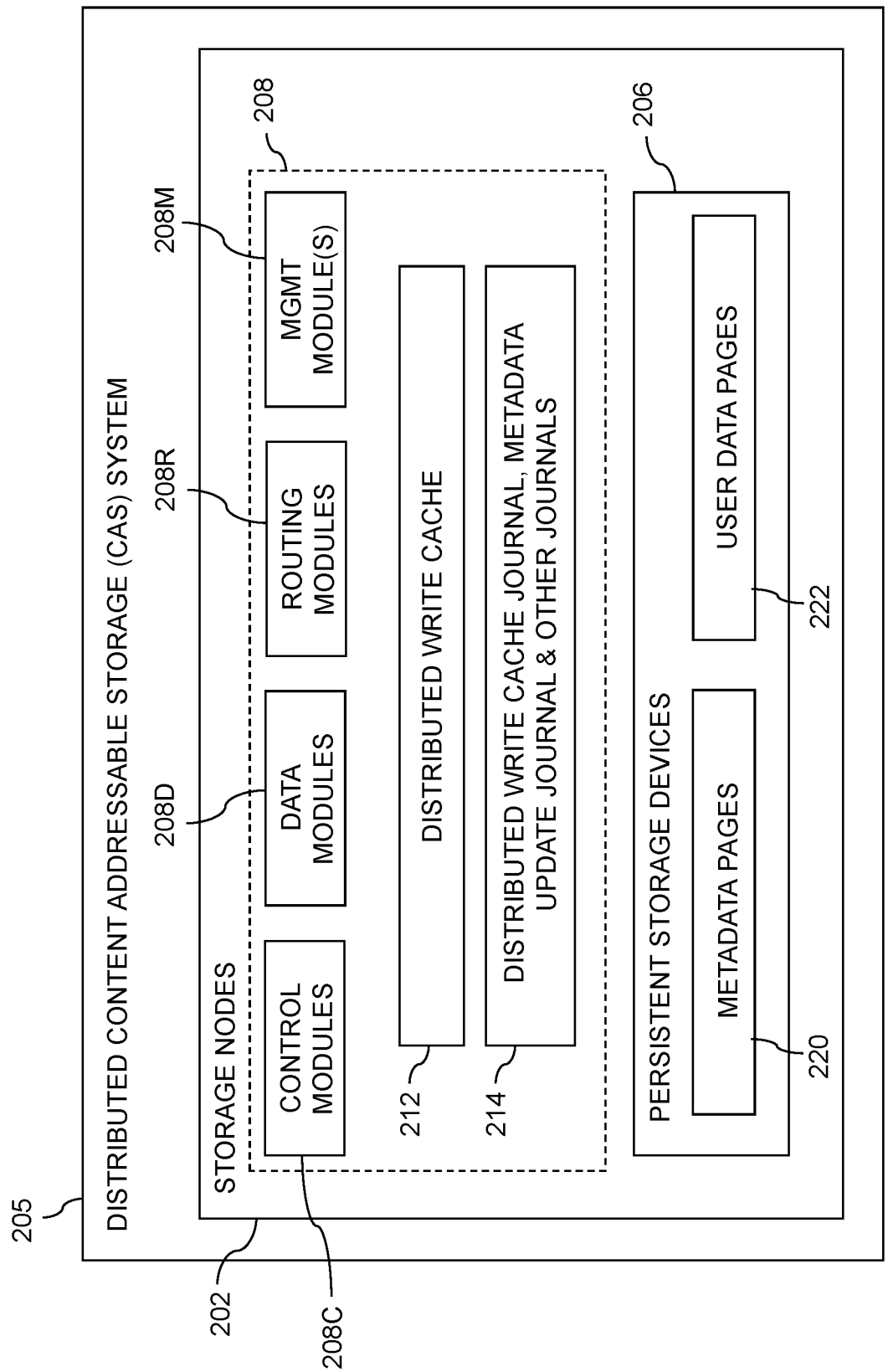
FIG. 2 shows an example of a distributed content addressable storage (CAS) system that illustratively represents one possible implementation of a distributed storage system in some embodiments.

FIG. 2 shows an example of a distributed content addressable storage (CAS) system 205 that illustratively represents a particular example implementation of the distributed storage system comprising the storage nodes 102 of FIG. 1. The distributed CAS system 205 is therefore assumed to be coupled to one or more host devices 101 of a computer system within information processing system 100.

The CAS system 205 comprises a plurality of storage devices 206 and an associated storage controller 208. The storage devices 206 store data of a plurality of storage volumes. The storage volumes illustratively comprise respective LUNs or other types of logical storage volumes. The stored data comprises metadata pages 220 and user data pages 222, both described in more detail elsewhere herein. The storage devices 206 and storage controller 208 are distributed across multiple storage nodes 202. The CAS system 205 can include additional components, such as local and remote interface logic and journal destaging logic, each also illustratively distributed across the storage nodes 202 of the CAS system 205.

The CAS system 205 is illustratively implemented as a distributed storage system, also referred to herein as a clustered storage system, in which each of at least a subset of the storage nodes 202 comprises a set of processing modules configured to communicate with corresponding sets of processing modules on other ones of the storage nodes 202. The sets of processing modules of the storage nodes of the CAS system 205 collectively comprise at least a portion of the storage controller 208 of the CAS system 205. For example, in some embodiments the sets of processing modules of the storage nodes collectively comprise a distributed storage controller of the CAS system 205. A "distributed storage system" as that term is broadly used herein is intended to encompass any storage system that, like the CAS system 205, is distributed across multiple storage nodes.

Although it is assumed that both the first storage node 102-1 and the second storage node 102-2 are part of a single content addressable storage system in some embodiments, other types of storage systems can be used for one or both of the first storage node 102-1 and the second storage node 102-2 in other embodiments. For example, it is possible that at least one of the storage nodes 102 in an illustrative embodiment need not be a content addressable storage system and need not include an ability to generate content-based signatures. In an embodiment of this type, the signature generation functionality can be implemented in a host device.

The storage controller 208 in the present embodiment is configured to implement multi-level bucket aggregation functionality for metadata update journal destaging of the type previously described in conjunction with FIG. 1.

The storage controller 208 includes a distributed write cache 212 and a set of distributed journals 214. The set of distributed journals 214 illustratively comprises a write cache journal, a metadata update journal and possibly one or more other journals. The distributed write cache 212 and the set of distributed journals 214 each illustratively have respective instances thereof on each of the storage nodes 202.

Additional modules that are assumed to be implemented in the storage controller 208 but are not explicitly shown in the figure include, for example, distributed instances of local and remote interface logic 110 and journal destaging logic 111, with respective different instances thereof being implemented on respective ones of the storage nodes 202. Each of the storage nodes 202 of the CAS system 205 is assumed to be implemented using at least one processing device comprising a processor coupled to a memory.

In the CAS system 205, logical addresses of data pages are mapped to physical addresses of the data pages using respective content-based signatures that are generated from those data pages. The data pages illustratively include user data pages 222. Metadata pages 220 are typically handled in a different manner, as will be described.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 kilobytes (KB), while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 205.

Also, the term "storage volume" as used herein is intended to be broadly construed, and should not be viewed as being limited to any particular format or configuration.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

As indicated above, the storage controller 208 in this embodiment is implemented as a distributed storage controller that comprises sets of processing modules distributed over the storage nodes 202. The storage controller 208 is therefore an example of what is more generally referred to herein as a distributed storage controller.

It is assumed in some embodiments that the processing modules of the storage controller 208 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage controller 208 illustratively comprise control modules 208C, data modules 208D, routing modules 208R and at least one management module 208M. Again, these and possibly other processing modules of the storage controller 208 are illustratively interconnected with one another in the full mesh network, such that each of the modules can communicate with each of the other modules, although other types of networks and different module interconnection arrangements can be used in other embodiments.

The management module 208M of the distributed storage controller in this embodiment may more particularly comprise a system-wide management module, also referred to herein as a system manager. Other embodiments can include multiple instances of the management module 208M implemented on different ones of the storage nodes 202. It is therefore assumed that the storage controller 208 comprises one or more management modules 208M.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The processing modules of the storage controller 208 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table illustratively comprises a plurality of entries accessible utilizing logical addresses as respective keys, with each such entry of the A2H table comprising a corresponding one of the logical addresses, a corresponding one of the hash handles, and possibly one or more additional fields. In some embodiments, the A2H table is assumed to comprise full hash digests in place of or in addition to hash handles. Other configurations are possible, and the term "address-to-hash table" as used herein is therefore intended to be broadly construed.

2. A hash-to-data ("H2D") table. The H2D table illustratively comprises a plurality of entries accessible utilizing hash handles as respective keys, with each such entry of the H2D table comprising a corresponding one of the hash handles, a physical offset of a corresponding one of the data pages, and possibly one or more additional fields. Again, full hash digests can be used in place of or in addition to hash handles.

3. A hash metadata ("HMD") table. The HMD table illustratively comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table. The PLB table illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length. Hash digests can be used in place of in addition to hash handles in some embodiments.

Again, the logical layer and physical layer mapping tables referred to above are examples only, and can be varied in other embodiments. For example, other types of hash-to-physical ("H2P") mapping tables may be used in addition to or in place of the above-noted H2D, HMD and/or PLB tables.

In some embodiments, certain ones of the above-described mapping tables are maintained by particular modules of storage controller 208. For example, the mapping tables maintained by the control modules 208C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules 208C may further comprise additional components such as respective messaging interfaces that are utilized by the control modules 208C to process routing-to-control messages received from the routing modules 208R, and to generate control-to-routing messages for transmission to the routing modules 208R. Such messaging interfaces can also be configured to process instructions and other messages received from the management module 208M and to generate messages for transmission to the management module 208M.

The data modules 208D comprise respective control interfaces. These control interfaces support communication between the data modules 208D and the control modules 208C. Also included in the data modules are respective SSD interfaces. These SSD interfaces support communications with corresponding ones of the storage devices 206 of the CAS system 205.

The above-described processing module arrangements are presented by way of example only, and can be varied in other embodiments.

In some embodiments, a given data path of the CAS system 205 comprises a particular one of the routing modules 208R, a particular one of the control modules 208C and a particular one of the data modules 208D, each configured to handle different stages of the data path. For example, a given IO request can comprise a read request or a write request received in the particular control module from the particular routing module. The particular control module processes the received IO request to determine the particular data module that has access to the one or more data pages targeted by that IO request.

Communication links may be established between the various processing modules of the storage controller 208 using well-known communication protocols such as TCP/IP and RDMA. For example, respective sets of IP links used in data transfer and corresponding messaging could be associated with respective different ones of the routing modules 208R.

In some embodiments, at least portions of the multi-level bucket aggregation functionality for metadata update journal destaging in the CAS system are distributed over at least the control modules 208C and data modules 208D of storage controller 208. Numerous other arrangements are possible. For example, portions of the functionality can be implemented in the one or more management modules 208, or using other types and arrangements of modules within or outside of the storage controller 208.

As indicated previously, the storage devices 206 are configured to store metadata pages 220 and user data pages 222, and one or more of the journals in the set of distributed journals 214, and may also store additional information not explicitly shown such as, for example, one or more system checkpoints and/or snapshots of storage volumes. The metadata pages 220 and the user data pages 222 in some embodiments are illustratively stored in respective designated metadata and user data areas of the storage devices 206. Accordingly, metadata pages 220 and user data pages 222 may be viewed as corresponding to respective designated metadata and user data areas of the storage devices 206.

As noted above, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 220 and the user data pages 222.

The user data pages 222 are part of a plurality of logical storage volumes configured to store files, blocks, objects or other arrangements of data, each also generally referred to herein as a "data item," on behalf of users of the CAS system 205. Each such logical storage volume may comprise particular ones of the above-noted user data pages 222 of the user data area. The user data stored in the user data pages 222 can include any type of user data that may be utilized in the system 100. The term "user data" herein is therefore also intended to be broadly construed.

A given storage volume for which content-based signatures are generated, illustratively by signature generators implemented in respective ones of the control modules 208C and/or elsewhere in the storage nodes 202, can comprise a set of one or more LUNs, each including multiple ones of the user data pages 222 stored in storage devices 206.

The CAS system 205 in the embodiment of FIG. 2 is configured to generate hash metadata providing a mapping between content-based digests of respective ones of the user data pages 222 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 222. The hash metadata generated by the CAS system 205 is illustratively stored as metadata pages 220 in the metadata area. The generation and storage of the hash metadata is assumed to be performed under the control of the storage controller 208.

Each of the metadata pages 220 characterizes a plurality of the user data pages 222. For example, in a given set of user data pages representing a portion of the user data pages 222, each of the user data pages is characterized by a volume identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 206.

Each of the metadata pages 220 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 220 in an illustrative embodiment comprises metadata pages having respective signatures. Each such metadata page characterizes a different set of user data pages. For example, the characterizing information in each metadata page can include the volume identifiers, offsets and content-based signatures for each of the user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 205 is illustratively distributed among the control modules 208C.

The multi-level bucket aggregation functionality for metadata update journal destaging in the CAS system 205 in this embodiment is assumed to be distributed across multiple distributed processing modules, including at least a subset of the processing modules 208C, 208D, 208R and 208M of the storage controller 208.

For example, the management module 208M of the storage controller 208 may include a journal destaging logic instance that engages corresponding journal destaging logic instances in all of the control modules 208C in order to support metadata update journal destaging in the CAS system 205.

In some embodiments, each of the user data pages 222 has a fixed size such as, for example, 8 KB, and its content-based signature is a 20-byte signature generated using the SHA1 secure hashing algorithm. Also, each page has a volume identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The storage controller 208 in this example is configured to group consecutive pages into page groups, to arrange the page groups into slices, and to assign the slices to different ones of the control modules 208C. For example, if there are 1024 slices distributed evenly across the control modules 208C, and there are a total of 16 control modules in a given implementation, each of the control modules "owns" 1024/16=64 slices. In such arrangements, different ones of the slices are assigned to different ones of the control modules 208C such that control of the slices within the storage controller 208 of the CAS system 205 is substantially evenly distributed over the control modules 208C of the storage controller 208.

The data modules 208D allow a user to locate a given user data page based on its signature. Each metadata page also has a size of 8 KB and includes multiple instances of the <lun_id, offset, signature> for respective ones of a plurality of the user data pages 222. Such metadata pages 220 are illustratively generated by the control modules 208C but are accessed using the data modules 208D based on a metadata page signature.

The metadata page signature in this embodiment is a 20-byte signature but is not based on the content of the metadata page. Instead, the metadata page signature is generated based on an 8-byte metadata page identifier that is a function of the volume identifier and offset information of that metadata page.

If a user wants to read a user data page having a particular volume identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 205 each illustratively comprise one or more IO operations directing that at least one data item of the CAS system 205 be written to in a particular manner. A given write request is illustratively received in the CAS system 205 from one of the host devices 101 over network 104. In some embodiments, a write request is received in the storage controller 208 of the CAS system 205, and directed from one processing module to another processing module of the storage controller 208. For example, a received write request may be directed from a routing module 208R of the storage controller 208 to a particular control module 208C of the storage controller 208. Other arrangements for receiving and processing write requests from one or more of the host devices 101 can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 208C, data modules 208D and routing modules 208R of the storage nodes 202 communicate with one another over a high-speed internal network such as an InfiniBand network. The control modules 208C, data modules 208D and routing modules 208R coordinate with one another to accomplish various IO processing tasks, as described elsewhere herein.

The write requests from the host devices identify particular data pages to be written in the CAS system 205 by their corresponding logical addresses each illustratively comprising a volume identifier and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 205 illustratively utilizes a two-level mapping process to map logical block addresses to physical block addresses. In some embodiments, the first level of mapping uses an A2H table and the second level of mapping uses an HMD table, with the A2H and HMD tables corresponding to respective logical and physical layers of the content-based signature mapping within the CAS system 205. The HMD table or a given portion thereof in some embodiments disclosed herein is more particularly referred to as an H2D table or H2P table, although it is to be understood that these and other mapping tables or other metadata structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 206. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 208C, while the HMD and PLB tables are utilized primarily by the data modules 208D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 205. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 205 correspond to respective physical blocks of a physical layer of the CAS system 205. The user data pages of the logical layer are organized by LBA and have reference via respective content-based signatures to particular physical blocks of the physical layer.

Each of the physical blocks has an associated reference count that is maintained within the CAS system 205. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 208C, 208D, 208R and 208M as shown in the FIG. 2 embodiment is presented by way of example only. Numerous alternative arrangements of processing modules of a distributed storage controller may be used to implement metadata update journal destaging in a distributed CAS system or other type of distributed storage system in other embodiments.

Additional examples of content addressable storage functionality that may be implemented in some embodiments by control modules 208C, data modules 208D, routing modules 208R and management module(s) 208M of storage controller 208 can be found in U.S. Pat. No. 9,104,326, entitled "Scalable Block Data Storage Using Content Addressing," which is incorporated by reference herein. Alternative arrangements of these and other storage node processing modules of a distributed storage controller in a distributed CAS system or other type of distributed storage system can be used in other embodiments.

As indicated above, the CAS system 205 illustratively comprises storage nodes 202 interconnected in a mesh network, with each such storage node comprising a set of processing modules configured to communicate with corresponding sets of processing modules on other ones of the storage nodes. A given such set of processing modules comprises at least a routing module, a control module and a data module, with the sets of processing modules of the storage nodes 202 of the CAS system 205 collectively comprising at least a portion of the storage controller 208 of the CAS system 205.

The storage nodes 202 and their respective sets of processing modules are managed by a system manager, illustratively implemented as a management module 208M within the set of processing modules on at least one of the storage nodes 202. Each of the storage nodes 202 illustratively comprises a CPU or other type of processor, a memory, a network interface card (NIC) or other type of network interface, and a subset of the storage devices 206, possibly arranged as part of a DAE of the storage node. These and other references to "disks" herein are intended to refer generally to storage devices, including SSDs, and should therefore not be viewed as limited in any way to spinning magnetic media.

An example of the operation of the CAS system 205 in processing IO operations will now be described with reference to FIG. 3, which shows the relationship between routing, control and data modules of one possible distributed implementation of CAS system 205 in an illustrative embodiment. More particularly, FIG. 3 illustrates a portion 300 of the CAS system 205, showing a routing module 208R-x, a control module 208C-y and a data module 208D-z in a distributed implementation of the storage controller 208. The routing module 208R-x, the control module 208C-y and the data module 208D-z are also denoted in this embodiment as an R-module, a C-module and a D-module, respectively.

These modules are respective processing modules of the storage controller 208, and are potentially located on different ones of the storage nodes 202 of the CAS system 205. For example, each of the storage nodes 202 of the CAS system 205 illustratively comprises at least one R-module, at least one C-module and at least one D-module, although many other storage node configurations are possible. In the present embodiment, the routing module 208R-x, the control module 208C-y and the data module 208D-z are assumed to be on respective different storage nodes x, y and z of the CAS system 205. The storage nodes x, y and z represent respective particular ones of the storage nodes 202. The storage node z that implements the D-module 208D-z comprises a subset of the storage devices 206 of the CAS system 205, with the subset of storage devices 206 on storage node z being denoted as storage devices 206-z. Each of the other storage nodes 202 of the CAS system 205 similarly has a different subset of the storage devices 206 associated therewith.

It is assumed in this example that the CAS system 205 manages data using a fixed-size page granularity (e.g., 4 KB, 8 KB or 16 KB), also referred to herein as the native page size of the CAS system 205. A unique hash digest is computed for each of the data pages by a content-based signature generator, illustratively using SHA1 or another secure hashing algorithm of the type described elsewhere herein.

In the CAS system 205, routing modules 208R such as R-module 208R-x illustratively include a storage command parser as shown, such as a SCSI command parser, although other command parsers for other storage protocols can be used in other embodiments. The routing modules 208R receive IO requests from one or more of the host devices 101, parse the corresponding storage commands and route them to the appropriate control modules 208C, which may be located on different storage nodes 202, illustratively using an address-to-control ("A2C") table. The A2C table maps different portions of a logical address space of the CAS system 205 across different ones of the control modules 208C. A given IO request can be sent by the corresponding one of the host devices 101 to any of the routing modules 208R of the CAS system 205.

The control modules 208C such as control module 208C-y receive the IO requests from the routing modules 208R, and use mapping tables such as the above-described A2H and H2D tables to identify the appropriate data modules 208D that store the corresponding data pages in the distributed CAS system 205. This illustratively includes performing a logical address to hash mapping as shown in the figure.

In processing read requests, the C-module 208C-y retrieves from the A2H table the hash digests of the corresponding requested pages, and sends read requests to the appropriate data modules 208D based on the H2D table.

In processing write requests, the C-module 208C-y illustratively computes the hash digests of the data pages based on the write data, sends write requests to the corresponding data modules 208D as determined from the H2D table, and updates the A2H table.

The data modules 208D such as D-module 208D-z are responsible for the physical storage of the data pages, and use mapping tables such as the above-described HMD and PLB tables and/or other types of H2P tables to determine the physical location of a given data page in the subset of storage devices 206 associated with that data module, using a hash digest, hash handle or other content-based signature supplied by a control module. This illustratively includes performing a hash to physical location mapping as shown in the figure. Such a hash to physical location mapping can utilize an H2P table of the type described elsewhere herein, illustratively comprising at least portions of the above-noted HMD and PLB tables. The data modules 208D in some embodiments additionally store a copy or "mirror" of such metadata in a memory of the respective corresponding storage nodes 202, in order to optimize performance by reducing accesses to the associated storage devices 206 during system operation.

A given one of the host devices 101 illustratively sends an IO request to a particular one of the routing modules 208R, possibly using random selection or another type of algorithm such as round robin to select a particular routing module for a particular IO request. Such selection can be implemented as part of a path selection algorithm performed by a multi-path input-output (MPIO) driver of the host device, in order to select a particular path comprising an initiator-target pair for delivery of the IO request to the CAS system 205. The initiator illustratively comprises a particular host bus adaptor (HBA) of the given host device, and the target illustratively comprises a particular port of the CAS system 205.

The processing of write requests in the CAS system 205 makes use of the distributed write cache 212 and the distributed write cache journal of the set of distributed journals 214, as will now be described in more detail. For example, such processing can include first, second and third stages in the processing of a given write request, with the stages also being referred to herein as Stage 1, Stage 2 and Stage 3, respectively.

The write cache 212 illustratively comprises a volatile memory of the CAS system 205 for temporarily storing data pages associated with write requests received from the host devices 101. The write cache 212 is backed up by the write cache journal that stores persisted copies of the write data. The write data of the write cache 212 is later destaged to a persistent data storage location in the storage devices 206.

For write requests received by the CAS system 205, address locks are placed on corresponding data pages, illustratively by associated ones of the control modules 208C, until the destaging of those data pages from the write cache 212 is completed.

A given write request targeting a particular data page in the CAS system 205 is illustratively processed by one of the control modules 208C and one of the data modules 208D in accordance with the following multi-stage process, the primary steps of which correspond generally to Stage 1, Stage 2 and Stage 3 of the processing of a given write request:

1. Front-end write request processing by control module. This is a synchronous stage handled by a particular control module, initiated upon receipt of the write request from one of the routing modules 208R. The data page is stored in an entry of the write cache 212 and persisted in the write cache journal, and the write request is then acknowledged back to the host device. The A2H table entry corresponding to the logical address of the data page being written is updated to point to the entry of the data page in the write cache 212.

2. Write cache destaging to data module. This is an asynchronous stage initiated by the control module to destage the data page to its appropriate destination data module. This stage more particularly implements an example write cache destaging process that includes the following steps:
   (a) Control module acquires address lock for data page;
   (b) Control module sends destage request to data module;
   (c) Data module loads associated metadata into RAM if not already loaded;
   (d) Data module writes data page and associated metadata and replies to control module with the hash digest of the data page;
   (e) Control module updates its A2H table to include the hash digest of the data page; and
   (f) Control module releases address lock for data page.

3. Background destaging from data module to storage device. This is an asynchronous stage initiated by the data module that persists the data page to a storage device associated with the data module. The data module stores the data page in the storage device and then updates its H2P table to point to the corresponding physical location.

The second stage as described above may be viewed an example of what is more generally referred to herein as a "write cache destaging process." That term as broadly used herein can encompass other types of additional or alternative processing operations, and may include at least portions of one or more other stages.

At the completion of the second stage, the data associated with the write request is still not written to the storage devices 206. The data is stored in the volatile memories of the write cache 212 and the data module 208D, and is persisted in the write cache journal for backup and recovery purposes.

The third stage of the write request handling process is illustratively performed asynchronously with the first and second stages, but in other embodiments may be performed synchronously with one or both of the other stages.

At the completion of the third stage, the data is persisted in the storage devices 206 so the corresponding write cache entry and its write cache journal entry are no longer needed, and can be deleted.

Other types and arrangements of write request processing stages can be used in other embodiments.

The CAS system 205 is configured to provide metadata update journal destaging to persistent storage devices 206 of the storage nodes 202 using operations similar to those previously described in conjunction with FIG. 1.

These and other operations associated with metadata update journal destaging in the CAS system 205 are illustratively performed at least in part by or under the control of the storage controller 208 and at least a subset of its processing modules 208C, 208D, 208R and 208M.

The particular features described above in conjunction with FIGS. 2 and 3 should not be construed as limiting in any way, and a wide variety of other distributed implementations of storage nodes 202 are possible.

The particular set of storage nodes 102 or 202 of the respective example distributed storage systems illustrated in FIGS. 1 and 2 is assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes may be implemented on respective distinct processing platforms, although numerous other arrangements are possible. At least portions of their associated host devices may be implemented on the same processing platforms as the storage nodes or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage nodes 102 to reside in different data centers. Numerous other distributed implementations of the storage nodes 102 and their respective associated sets of host devices are possible. Similarly, various distributed implementations of CAS system 205 and its storage nodes 202 are possible.

Additional examples of processing platforms utilized to implement storage systems and possibly their associated host devices in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, storage nodes 102 or 202, network 104, storage devices 106 or 206, storage controllers 108 or 208, local and remote interface logic 110 and journal destaging logic 111 can be used in other embodiments.

Figure 3:
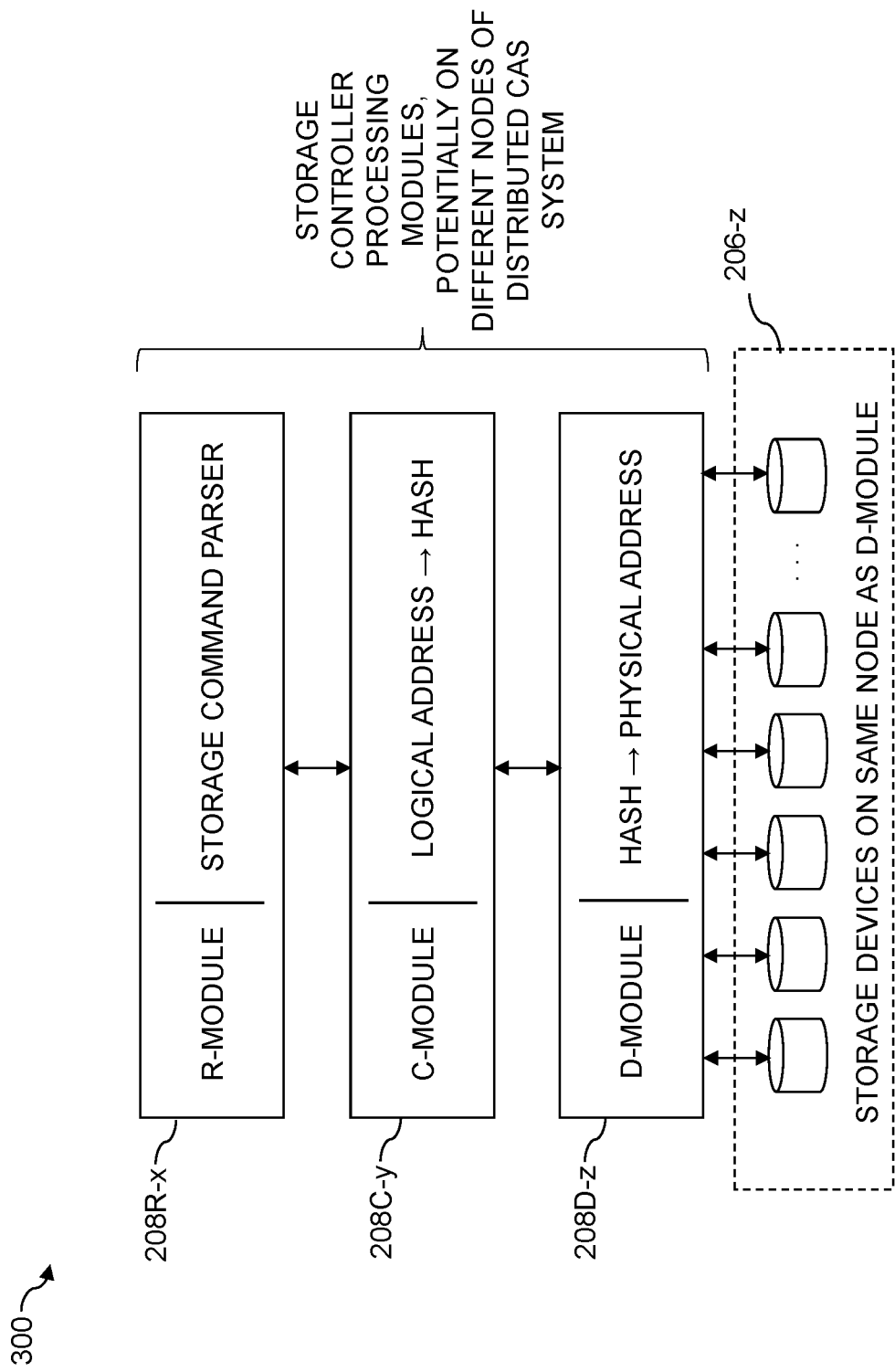
FIG. 3 shows an example relationship between routing, control and data modules of the distributed CAS system of FIG. 2 in an illustrative embodiment.

It should be understood that the particular sets of modules and other components implemented in a distributed storage system as illustrated in FIGS. 1, 2 and 3 are presented by way of example only. In other embodiments, only subsets of these components, or additional or alternative sets of components, may be used, and such components may exhibit alternative functionality and configurations.

For example, in other embodiments, multi-level bucket aggregation functionality for metadata update journal destaging can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the illustrative embodiments of FIGS. 4A, 4B and 4C, which show example metadata pages, first-level buckets and second-level buckets, and the flow diagram of FIG. 5, which implements a process for metadata update journal maintenance and destaging in a distributed storage system.

Figure 4A:
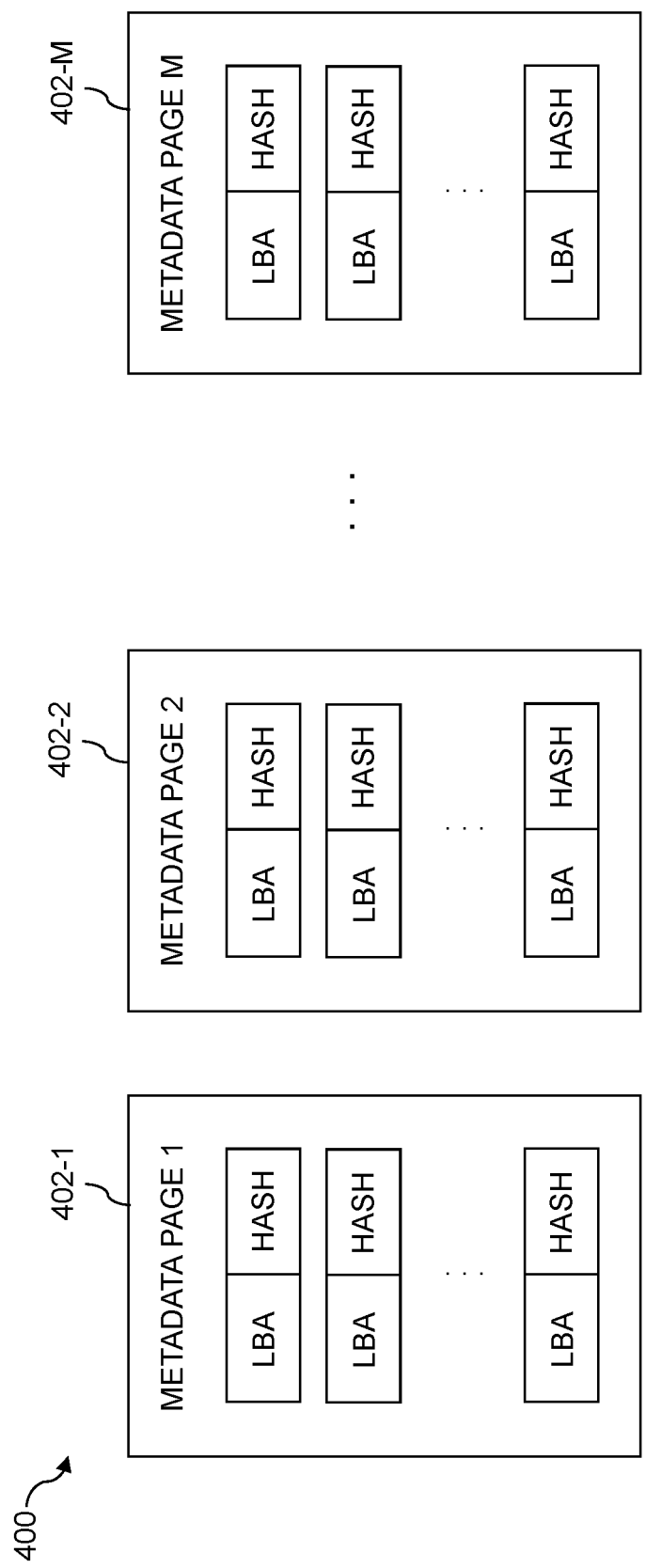
FIGS. 4A, 4B and 4C show example metadata structures of a metadata update journal of a distributed storage system in illustrative embodiments.

Referring initially to FIG. 4A, a metadata update journal illustratively tracks updates to metadata pages, such as a set 400 of metadata pages 402-1, 402-2, ... 402-M. Each of the metadata pages 402 comprises a plurality of address-to-hash mapping pairs. The address-to-hash mapping pairs in this embodiment illustratively map respective logical block addresses or LBAs of respective user data pages to corresponding content-based signatures of those data pages, with the content-based signatures comprising "hashes" of the respective data pages. Such hashes can comprise, for example, hash digests or hash handles of the type described elsewhere herein, although the term "hash" as used herein is intended to be broadly construed and therefore should not be viewed as limited to these illustrative arrangements.

Figure 4B:
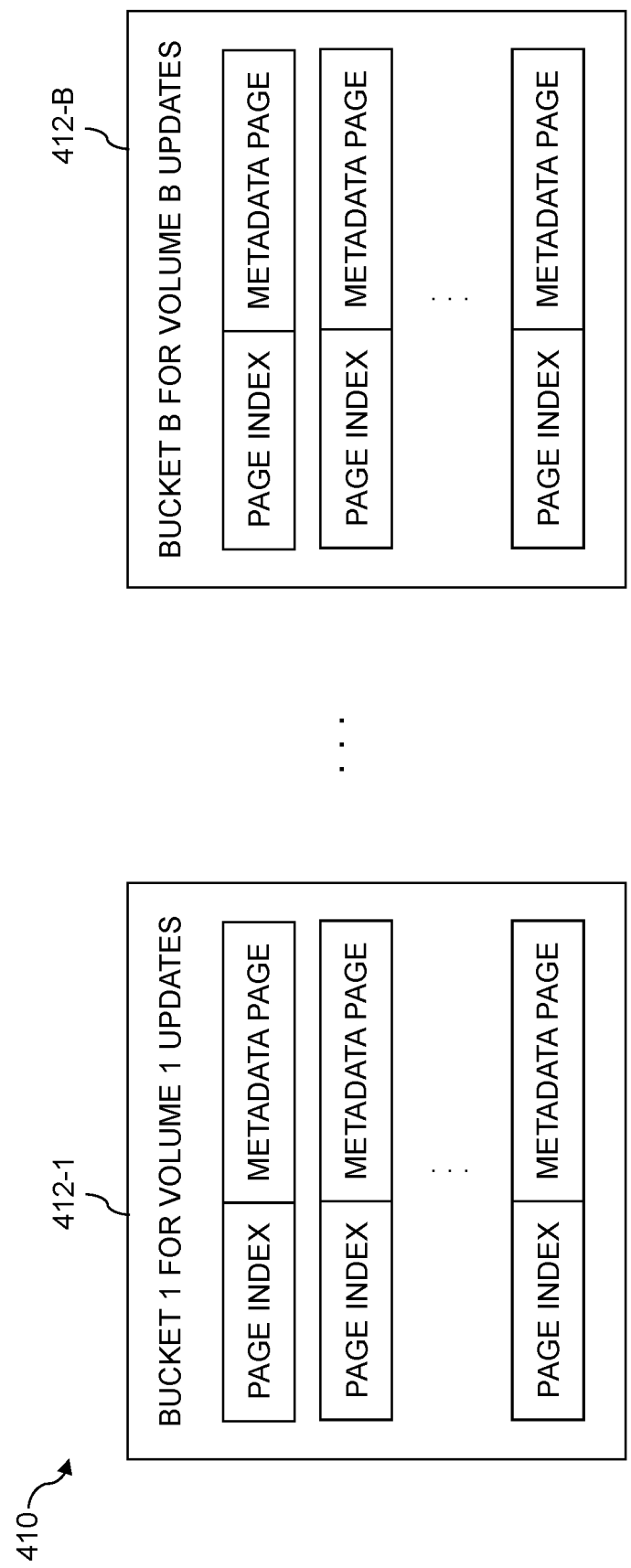

As illustrated in FIG. 4B, the metadata pages 402 are arranged in a set 410 of first-level buckets 412-1, ... 412-B. Each of the first-level buckets 412 is assumed to be associated with a different logical storage volume of the distributed storage system. The first-level buckets 412 contain respective subsets of the metadata pages 402 for respective different logical storage volumes. For example, first-level bucket 412-1 is used for Volume 1 updates, and first-level bucket 412-B is used for Volume B updates. Each of the metadata pages in the first-level buckets 412 has an associated page index that specifies a location of that page within its corresponding one of the first-level buckets 412.

Figure 4C:
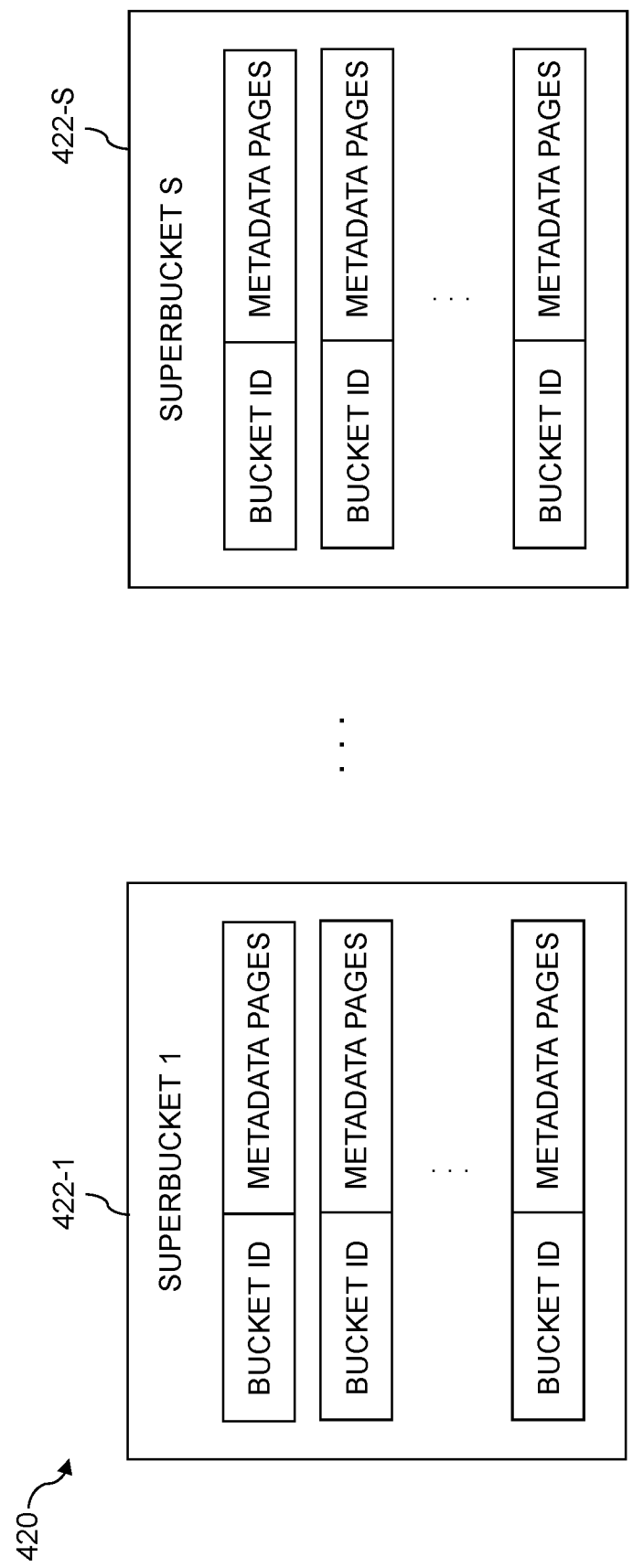

Turning now to FIG. 4C, a set 420 of second-level buckets 422-1, ... 422-S are each configured to aggregate multiple metadata pages from different ones of the first-level buckets 412, illustratively in order to increase a number of metadata updates in each of the second-level buckets 422 relative to numbers of metadata updates in its corresponding ones of the first-level buckets 412. The second-level buckets 422 are also referred to in this embodiment as "superbuckets." A given one of the second-level buckets 422 illustratively comprises a plurality of entries from respective different ones of the first-level buckets 412, with each such entry comprising at least one of the metadata pages 402 and a corresponding first-level bucket identifier for that metadata page. The bucket identifier in the figure is also referred to as a Bucket ID, and a given instance thereof specifies the particular first-level bucket 412 from which the corresponding one or more metadata pages 402 were aggregated. The use of bucket identifiers as shown in FIG. 4C allows entries from different first-level buckets 412 to be mixed within a given one of the second-level buckets 422.

In one possible alternative approach, a given one of the second-level buckets 422 can comprise a plurality of entries from respective different ones of the first-level buckets 412, with the entries being arranged within a plurality of dynamic partitions associated with the respective different ones of the first-level buckets 412. Such utilization of dynamic partitions in the second-level buckets 422 for respective ones of the first-level buckets 412 can eliminate the need for bucket identifiers of the type previously described.

The variables M, B and S in respective FIGS. 4A, 4B and 4C are respective arbitrary integers that denote the number of metadata pages, the number of first-level buckets and the number of second-level buckets, respectively. Their values can vary depending upon the particular system implementation. It is to be appreciated that these and other aspects of the metadata pages and bucket arrangements described herein are presented by way of illustrative example only. Numerous other arrangements are possible. For example, as mentioned previously, more than two different levels of buckets can be used in other embodiments.

Figure 5:
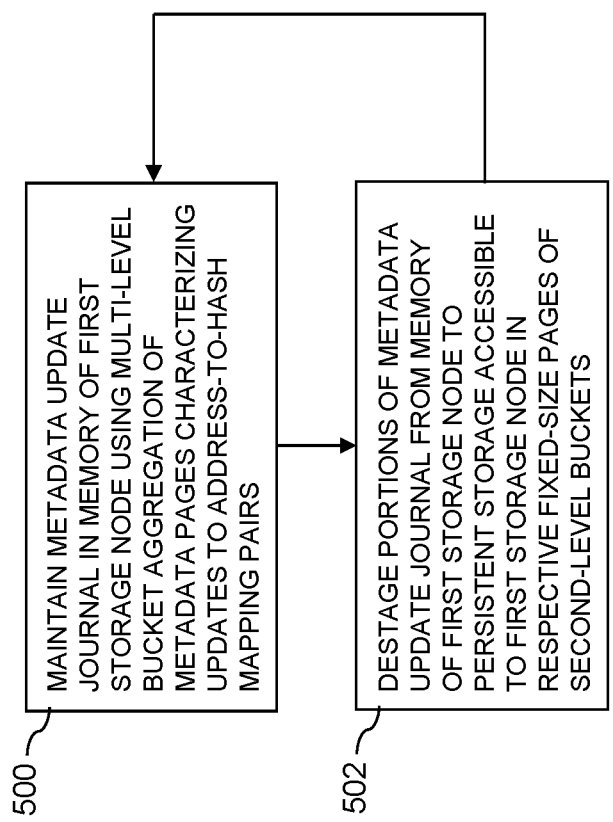
FIG. 5 is a flow diagram of an example process using multi-level bucket aggregation for journal destaging in a distributed storage system in an illustrative embodiment.

The FIG. 5 process may be viewed as a portion of an example algorithm implemented at least in part by the storage controllers 108 of the respective storage nodes 102 of the distributed storage system of FIG. 1, utilizing metadata pages, first-level buckets and second-level buckets of the type shown in FIGS. 4A, 4B and 4C. For example, such an algorithm is illustratively carried out by one or more instances of local and remote interface logic 110 and journal destaging logic 111 in respective ones of the storage controllers 108. Such an algorithm can also be implemented by the distributed storage controller 208 and its processing modules 208C, 208D, 208R and 208M distributed over the storage nodes 202 of CAS system 205 of FIG. 2. These and other algorithms disclosed herein are more generally applicable to a wide variety of other distributed storage systems each comprising two or more storage nodes.

The process as illustrated in FIG. 5 illustratively includes steps 500 and 502, implementing operations for metadata update journal maintenance and destaging using multi-level bucket aggregation in a distributed storage system. It is assumed that the steps of the process are performed primarily by a particular one of the storage nodes of the distributed storage system, which may illustratively correspond to one of the storage nodes 102-1 and 102-2 of FIG. 1, or any one of the storage nodes 202 of FIG. 2. The other storage nodes 102 or 202 are assumed to implement similar functionality.

In step 500, a metadata update journal is maintained in memory of a first storage node using multi-level bucket aggregation of metadata pages 402 characterizing updates to address-to-hash mapping pairs. The metadata pages 402 are arranged in first-level buckets 412 as previously described, and metadata pages of the first-level buckets 412 are aggregated in second-level buckets 422, also as previously described.

In step 502, portions of the metadata update journal are destaged from memory of the first storage node to persistent storage accessible to the first storage node in respective fixed-size pages of the second-level buckets 422. The process then returns to step 500 as indicated in order to continue maintaining the metadata update journal.

Similar operations may be performed on one or more additional storage nodes of the distributed storage system.

The steps are shown in sequential order for clarity and simplicity of illustration only, and certain steps can at least partially overlap with other steps.

The particular processing operations and other system functionality described in conjunction with the flow diagram of FIG. 5 are presented by way of illustrative example only, and should not be construed as limiting the scope of the disclosure in any way. Alternative embodiments can use other types of processing operations for metadata update journal maintenance and destaging using multi-level bucket aggregation in a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the processes can be performed in parallel with one another in order to implement a plurality of different metadata update journal maintenance and destaging processes for respective different distributed storage systems or portions thereof within a given information processing system.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A distributed storage controller as disclosed herein is illustratively configured to implement functionality for metadata update journal maintenance and destaging using multi-level bucket aggregation, such as an algorithm comprising one or more processes of the type shown in FIG. 5. Such a distributed storage controller can comprise, for example, storage controllers 108-1 and 108-2 of FIG. 1 or distributed storage controller 208 in CAS system 205, as configured to perform the steps of the process of FIG. 5.

A distributed storage controller can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, distributed storage controllers and other system components may be implemented at least in part using processing devices of such processing platforms. For example, respective distributed modules of a distributed storage controller can be implemented in respective containers running on respective ones of the processing devices of a processing platform.

Illustrative embodiments of a distributed storage system with multi-level bucket aggregation functionality for metadata update journal destaging as disclosed herein can provide a number of significant advantages relative to conventional arrangements.

For example, in some embodiments, each of a plurality of storage nodes of a distributed storage system is configured to perform maintenance and destaging operations for a metadata update journal using multi-level bucket aggregation, in a manner that substantially improves amortization and reduces bandwidth utilization, thereby enhancing overall performance of the distributed storage system.

These and other embodiments avoid the problems associated with conventional journal destaging arrangements based on batch aggregation, by substantially increasing efficiency in the presence of certain types of write operations, such as, for example, random writes, writes to a large number of relatively small logical storage volumes, and writes involving many short-lived snapshots with a relatively small number of overwrites, as well as other types of write operations involving only relatively small numbers of metadata updates.

For such write operations and in numerous other situations involving processing of IO operations in a distributed storage system, the multi-level bucket aggregation provided in illustrative embodiments disclosed herein can dramatically improve metadata update journal amortization, thereby reducing bandwidth utilization and improving overall system performance. For example, such embodiments can advantageously prevent journal destaging operations from interfering with efficient processing of host device IO operations, thereby significantly improving the overall IO processing performance of the distributed storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with multi-level bucket aggregation functionality for metadata update journal destaging will now be described in greater detail with reference to FIGS. 6 and 7. Although described in the context of system 100, these platforms may also be used to implement at least portions of other information processing systems in other embodiments.

Figure 6:
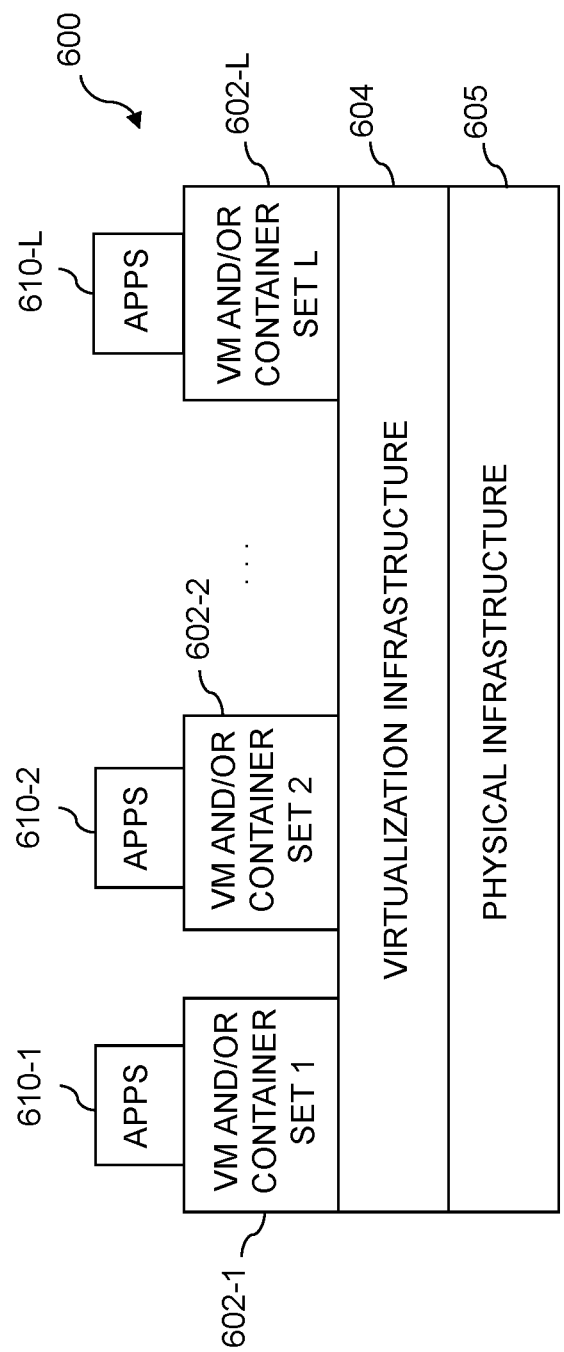
FIGS. 6 and 7 show examples of processing platforms that may be utilized to implement at least a portion of an information processing system in illustrative embodiments.
Figure 7:
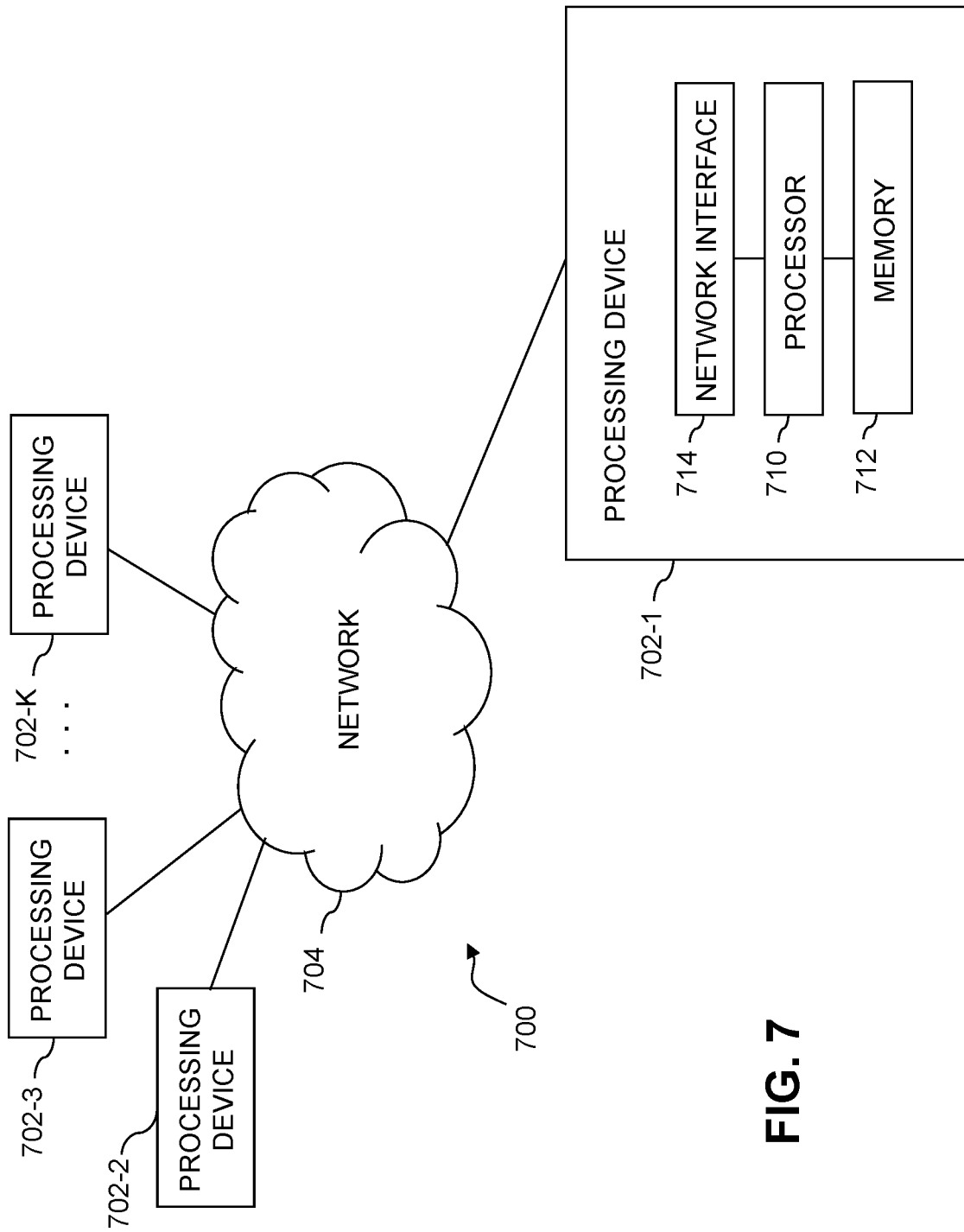

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide multi-level bucket aggregation functionality for metadata update journal destaging in a distributed storage system of the type described above using one or more processes running on a given one of the VMs. For example, each of the VMs can implement logic instances and/or other components for implementing multi-level bucket aggregation functionality for metadata update journal destaging in the distributed storage system of FIG. 1 or the distributed CAS system 205 of FIG. 2.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide multi-level bucket aggregation functionality for metadata update journal destaging in a distributed storage system of the type described above. For example, a container host device supporting multiple containers of one or more container sets can implement logic instances and/or other components for implementing multi-level bucket aggregation functionality for metadata update journal destaging in the distributed storage system of FIG. 1 or the distributed CAS system 205 of FIG. 2.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the multi-level bucket aggregation functionality for metadata update journal destaging provided by one or more components of a distributed storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, local and remote interfaces, journal destaging logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to maintain a metadata update journal for at least a first storage node of a plurality of storage nodes of a distributed storage system; and
to destage the metadata update journal of the first storage node to one or more storage devices accessible to the first storage node;
the metadata update journal of the first storage node utilizing a multi-level bucket aggregation of metadata updates in which:
metadata pages each comprising a plurality of address-to-hash mapping pairs are arranged in a plurality of first-level buckets containing respective subsets of the metadata pages for respective different logical storage volumes; and
a plurality of second-level buckets are each configured to aggregate multiple metadata pages from different ones of the first-level buckets in order to increase a number of metadata updates in each second-level bucket relative to numbers of metadata updates in its corresponding first-level buckets.

2. The apparatus of claim 1 wherein said at least one processing device comprises at least a portion of a distributed storage controller of the distributed storage system.

3. The apparatus of claim 1 wherein each of at least a subset of the storage nodes of the distributed storage system comprises a set of processing modules configured to communicate with corresponding sets of processing modules on other ones of the storage nodes, a given such set of processing modules comprising at least a routing module, a control module and a data module, the sets of processing modules of the storage nodes of the distributed storage system collectively comprising at least a portion of a distributed storage controller of the distributed storage system.

4. The apparatus of claim 1 wherein the second-level buckets are arranged in pages and wherein multiple metadata pages aggregated from different ones of the first-level buckets into a particular one of the pages of a given one of the second-level buckets have a same page index within their respective first-level buckets.

5. The apparatus of claim 1 wherein a given one of the second-level buckets comprises a plurality of entries from respective different ones of the first-level buckets with each such entry comprising at least one of the metadata pages and a corresponding first-level bucket identifier for that metadata page.

6. The apparatus of claim 1 wherein a given one of the second-level buckets comprises a plurality of entries from respective different ones of the first-level buckets with the plurality of entries being arranged within a plurality of dynamic partitions associated with the respective different ones of the first-level buckets.

7. The apparatus of claim 1 wherein the maintaining and destaging of the metadata update journal are performed utilizing second-level bucket pages of one or more of the second-level buckets.

8. The apparatus of claim 7 wherein each of a plurality of metadata pages of a given one of the second-level bucket pages has the same page index within its corresponding one of the first-level buckets.

9. The apparatus of claim 7 wherein existence bitmaps are maintained for respective ones of the second-level bucket pages with each such existence bitmap indicating which of the metadata pages are present in the corresponding second-level bucket page.

10. The apparatus of claim 1 wherein the multi-level bucket aggregation is configured to assign metadata pages for multiple relatively small logical storage volumes with respective relatively small numbers of metadata updates to first-level buckets for which the metadata pages are aggregated into a single second-level bucket, and to assign metadata pages for a relatively large logical storage volume that has a relatively large number of metadata updates to one or more first-level buckets for which the metadata pages are not combined with metadata pages of other first-level buckets of other logical storage volumes in aggregating metadata pages of those one or more first-level buckets into one or more second-level buckets.

11. The apparatus of claim 1 wherein the metadata update journal tracks updates to an address-to-hash metadata structure of the distributed storage system.

12. The apparatus of claim 1 wherein obsoleted bitmaps are maintained for respective ones of the second-level bucket pages with each such obsoleted bitmap indicating entries of the corresponding second-level bucket page for which one or more associated first-level buckets are obsolete due to deletion of its corresponding logical storage volume.

13. The apparatus of claim 12 wherein entries of a given one of the obsoleted bitmaps for one or more of the first-level buckets are set in conjunction with the deletion of the corresponding logical storage volume and are subsequently cleared in conjunction with metadata updates to the one or more first-level buckets subsequent to creation of a new logical storage volume having a same volume identifier as the deleted logical storage volume.

14. The apparatus of claim 1 wherein the one or more storage devices comprise a first plurality of storage devices associated with the first storage node and one or more additional pluralities of storage devices associated with respective additional ones of the storage nodes, and wherein the first plurality of storage devices are implemented in a storage array enclosure of the first storage node.

15. A method comprising:
 maintaining a metadata update journal for at least a first storage node of a plurality of storage nodes of a distributed storage system; and
 destaging the metadata update journal of the first storage node to one or more storage devices accessible to the first storage node;
 the metadata update journal of the first storage node utilizing a multi-level bucket aggregation of metadata updates in which:
 metadata pages each comprising a plurality of address-to-hash mapping pairs are arranged in a plurality of first-level buckets containing respective subsets of the metadata pages for respective different logical storage volumes; and
 a plurality of second-level buckets are each configured to aggregate multiple metadata pages from different ones of the first-level buckets in order to increase a number of metadata updates in each second-level bucket relative to numbers of metadata updates in its corresponding first-level buckets;
 wherein the method is performed by at least one processing device comprising a processor coupled to a memory.

16. The method of claim 15 wherein the second-level buckets are arranged in pages and wherein multiple metadata pages aggregated from different ones of the first-level buckets into a particular one of the pages of a given one of the second-level buckets have a same page index within their respective first-level buckets.

17. The method of claim 15 wherein the multi-level bucket aggregation is configured to assign metadata pages for multiple relatively small logical storage volumes with respective relatively small numbers of metadata updates to first-level buckets for which the metadata pages are aggregated into a single second-level bucket, and to assign metadata pages for a relatively large logical storage volume that has a relatively large number of metadata updates to one or more first-level buckets for which the metadata pages are not combined with metadata pages of other first-level buckets of other logical storage volumes in aggregating metadata pages of those one or more first-level buckets into one or more second-level buckets.

18. A computer program product comprising a non-transitory processor-readable storage medium having stored therein program code of one or more software programs, wherein the program code when executed by at least one processing device causes said at least one processing device:

to maintain a metadata update journal for at least a first storage node of a plurality of storage nodes of a distributed storage system; and to destage the metadata update journal of the first storage node to one or more storage devices accessible to the first storage node;

the metadata update journal of the first storage node utilizing a multi-level bucket aggregation of metadata updates in which:

metadata pages each comprising a plurality of address-to-hash mapping pairs are arranged in a plurality of first-level buckets containing respective subsets of the metadata pages for respective different logical storage volumes; and a plurality of second-level buckets are each configured to aggregate multiple metadata pages from different ones of the first-level buckets in order to increase a number of metadata updates in each second-level bucket relative to numbers of metadata updates in its corresponding first-level buckets.

19. The computer program product of claim 18 wherein the second-level buckets are arranged in pages and wherein multiple metadata pages aggregated from different ones of the first-level buckets into a particular one of the pages of a given one of the second-level buckets have a same page index within their respective first-level buckets.

20. The computer program product of claim 18 wherein the multi-level bucket aggregation is configured to assign metadata pages for multiple relatively small logical storage volumes with respective relatively small numbers of metadata updates to first-level buckets for which the metadata pages are aggregated into a single second-level bucket, and to assign metadata pages for a relatively large logical storage volume that has a relatively large number of metadata updates to one or more first-level buckets for which the metadata pages are not combined with metadata pages of other first-level buckets of other logical storage volumes in aggregating metadata pages of those one or more first-level buckets into one or more second-level buckets.

* * * * *